US006704783B1

(12) United States Patent
Shibata et al.

(10) Patent No.: US 6,704,783 B1
(45) Date of Patent: Mar. 9, 2004

(54) REFERENCE STATE OUTPUT SYSTEM, REFERENCE STATE OUTPUT METHOD, AND COMPUTER READABLE MEDIUM ON WHICH REFERENCE STATE OUTPUT PROGRAM IS RECORDED

(75) Inventors: Keiichiro Shibata, Yokohama (JP); Hitoshi Ikeda, Yokohama (JP); Hidefumi Shiozawa, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/528,824

(22) Filed: Mar. 20, 2000

(30) Foreign Application Priority Data

Oct. 28, 1999 (JP) ............................. 11-307386

(51) Int. Cl.[7] ........................................... G06F 15/173
(52) U.S. Cl. ....................................... 709/224; 709/223
(58) Field of Search ................................ 709/203, 224, 709/218, 219, 238, 239, 223; 705/51

(56) References Cited

U.S. PATENT DOCUMENTS

| | | | | |
|---|---|---|---|---|
| 3,829,831 A | * | 8/1974 | Yamamoto et al. | |
| 5,758,257 A | * | 5/1998 | Herz et al. | ............... 705/51 |
| 5,796,952 A | * | 8/1998 | Davis et al. | ............... 709/224 |
| 5,862,336 A | * | 1/1999 | Nakagaki et al. | ........... 709/224 |
| 5,960,407 A | * | 9/1999 | Vivona | ................. 709/203 |
| 6,098,106 A | * | 8/2000 | Philyaw et al. | ............. 709/224 |
| 6,219,021 B1 | * | 4/2001 | Izumi | |
| 6,286,046 B1 | * | 9/2001 | Bryant | ................. 709/224 |

FOREIGN PATENT DOCUMENTS

| | | |
|---|---|---|
| JP | 9-114864 | 5/1997 |
| JP | 11-27314 | 1/1999 |
| JP | 11-46464 | 2/1999 |

* cited by examiner

Primary Examiner—Le Hien Luu
Assistant Examiner—Quang Nguyen
(74) Attorney, Agent, or Firm—Katten Muchin Zavis Rosenman

(57) ABSTRACT

A reference state output system, a reference state output method, and a computer readable medium on which a reference state output program is recorded according to the present invention includes a calculation unit for calculating reference times per character included in referred information and outputting a reference state as information including the reference times and a standard deviation of the reference times, and an editing unit for calculating deviations of the reference times per character of each piece of information by the standard deviation of the reference times of the information on the basis of the reference state, and outputting the degree of interest in the information. Therefore, the degree of interest in provided information of an information referrer can be accurately output.

15 Claims, 21 Drawing Sheets

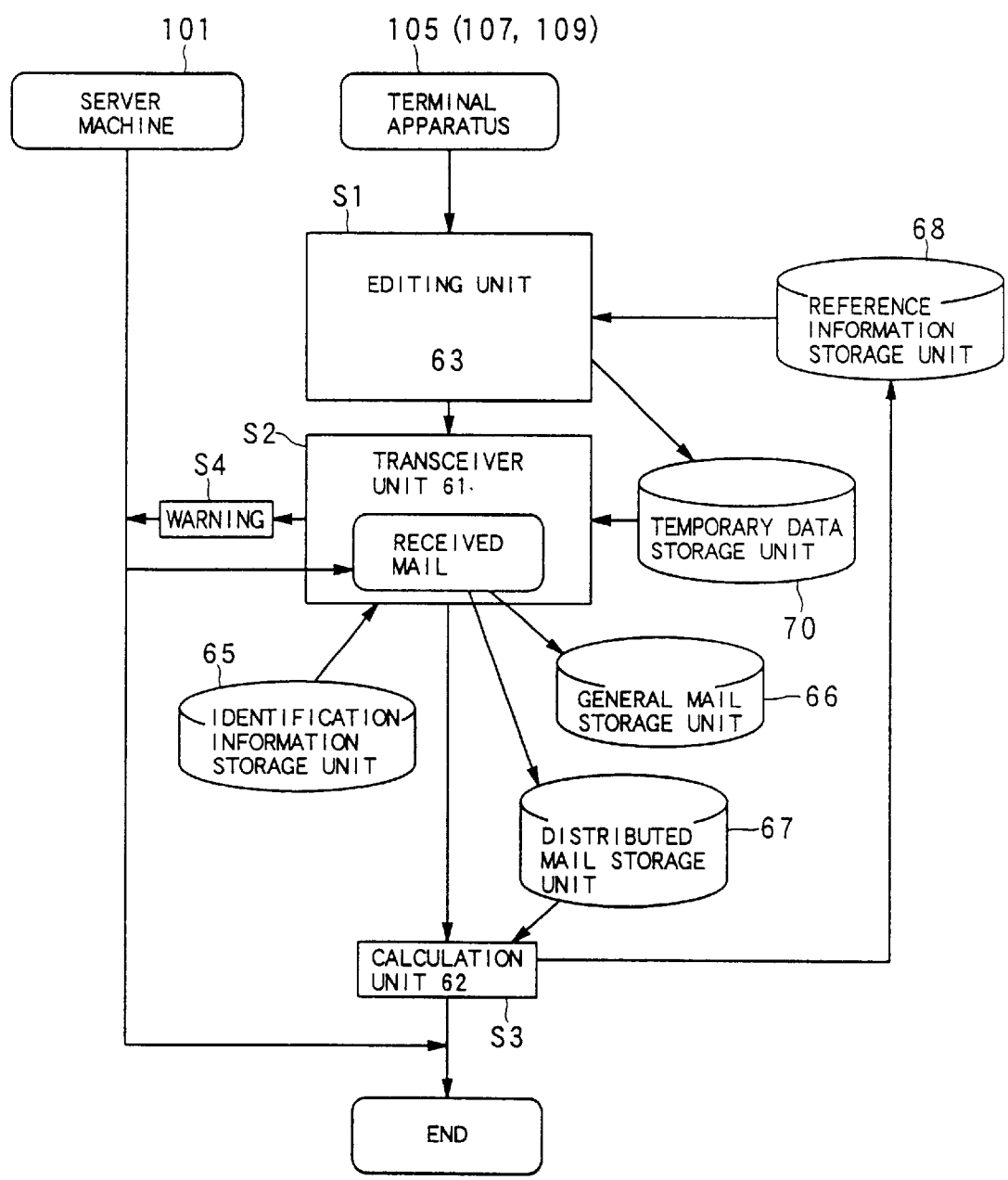

FIG. 6

REFERENCE STATE

68a

| DISTRIBUTOR | MAIL NUMBER | ARTICLE NUMBER | THE NUMBER OF CHARACTERS | REFERENCE TIME | REFERENCE COUNT | EXPECTED DATE OF DELETION | UPDATE DISPLAY |
|---|---|---|---|---|---|---|---|
| COMPANY A | 1 | 1 | 100 | 20 | 1 | 1999/5/1 | 1 |
| COMPANY A | 1 | 2 | 200 | 10 | 3 | 1999/5/1 | 1 |
| COMPANY C | 1 | 1 | 500 | 40 | 1 | 1999/5/1 | 1 |
| COMPANY D | 1 | 1 | 300 | 10 | 1 | 1999/4/20 | 0 |
| COMPANY A | 2 | 1 | 400 | 30 | 2 | 1999/5/1 | 1 |
| COMPANY A | 3 | 1 | 100 | 20 | 5 | 1999/7/5 | 1 |
| COMPANY B | 1 | 1 | 200 | 70 | 2 | 1999/5/1 | 1 |
| COMPANY A | 4 | 1 | 300 | 20 | 4 | 1999/8/6 | 1 |

MEANINGS OF WORDS

DISTRIBUTOR : MAIL DISTRIBUTOR
MAIL NUMBER : NUMBER WHICH IS UNIQUE IN DISTRIBUTOR AND WHICH IS GIVEN
 TO MAIL BY DISTRIBUTOR
ARTICLE NUMBER : NUMBER WHICH IS UNIQUE IN MAIL AND WHICH IS GIVEN TO ARTICLE
 IN ONE MAIL
REFERENCE TIME : TIME PER CHARACTER FOR WHICH REFERRER SEES CORRESPONDING ARTICLE
REFERENCE COUNT : THE NUMBER OF TIMES WHICH REFERRER SEES CORRESPONDING ARTICLE
EXPECTED DATE : DATE DETERMINED BY DISTRIBUTOR FOR EACH ARTICLE.
 OF DELETION PERIOD FOR WHICH INFORMATION IS REQUIRED IS DESIGNATED.
UPDATE DISPLAY : "1" IS SET WHEN ARTICLE IS REFERRED TO.
 "0" IS SET WHEN INFORMATION IS RETURNED TO DISTRIBUTOR.

FIG. 7

MAIL TRANSMISSION TEMPORARY DATA

| DISTRIBUTOR | MAIL NUMBER | ARTICLE NUMBER | THE NUMBER OF CHARACTERS | REFERENCE TIME | REFERENCE COUNT | DEVIATION |
|---|---|---|---|---|---|---|
| COMPANY A | 1 | 1 | 100 | 20 | 1 | 45 |
| COMPANY A | 1 | 2 | 200 | 10 | 3 | 39 |
| COMPANY A | 3 | 1 | 100 | 20 | 5 | 45 |
| COMPANY A | 4 | 1 | 300 | 70 | 4 | 72 |

| DISTRIBUTOR | MAIL NUMBER | ARTICLE NUMBER | THE NUMBER OF CHARACTERS | REFERENCE TIME | REFERENCE COUNT | DEVIATION |
|---|---|---|---|---|---|---|
| COMPANY B | 1 | 1 | 200 | 20 | 2 | 45 |

| DISTRIBUTOR | MAIL NUMBER | ARTICLE NUMBER | THE NUMBER OF CHARACTERS | REFERENCE TIME | REFERENCE COUNT | DEVIATION |
|---|---|---|---|---|---|---|
| COMPANY C | 1 | 1 | 500 | 40 | 1 | 55 |

| DISTRIBUTOR | MAIL NUMBER | ARTICLE NUMBER | THE NUMBER OF CHARACTERS | REFERENCE TIME | REFERENCE COUNT | DEVIATION |
|---|---|---|---|---|---|---|
| COMPANY D | 1 | 1 | 400 | 30 | 2 | 50 |

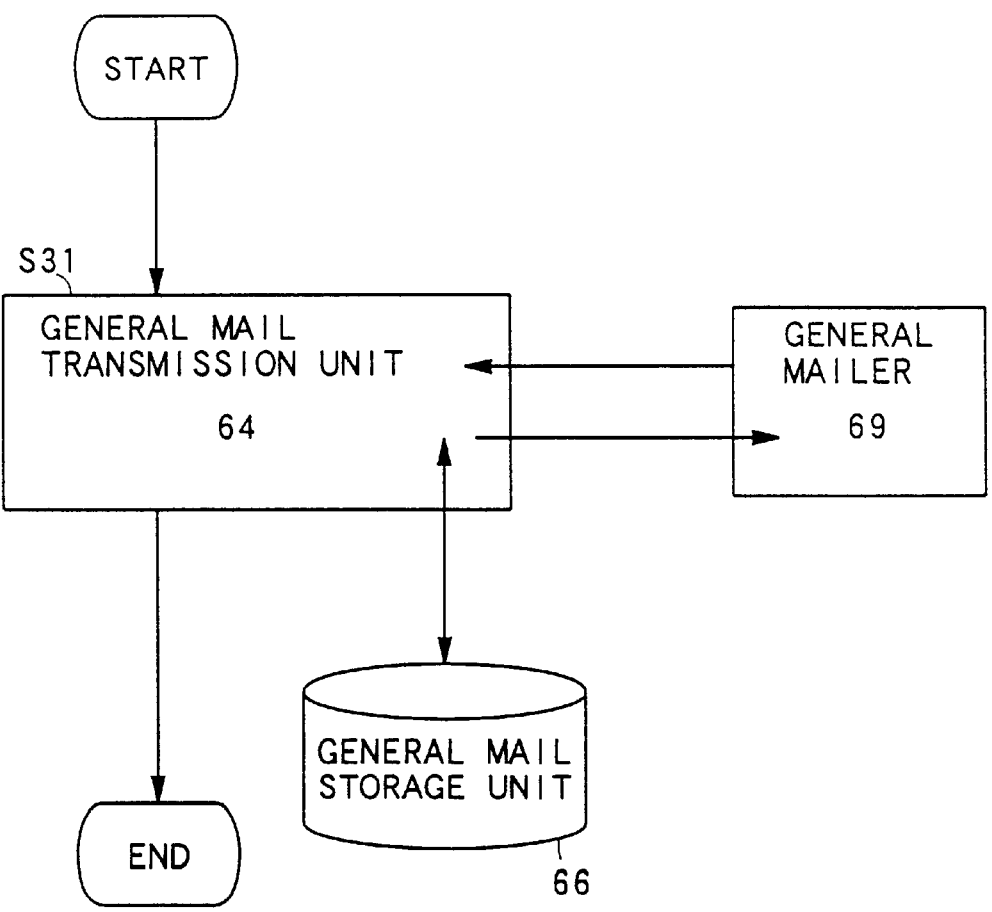

FIG.16

REFERENCE STATE RECEIVED BY DISTRIBUTOR

| DISTRIBUTOR | MAIL NUMBER | ARTICLE NUMBER | THE NUMBER OF CHARACTERS | REFERENCE TIME | REFERENCE COUNT | DEVIATION |
|---|---|---|---|---|---|---|
| COMPANY A | 1 | 1 | 100 | 20 | 1 | 45 |
| COMPANY A | 1 | 2 | 200 | 10 | 3 | 39 |
| COMPANY A | 3 | 1 | 100 | 20 | 5 | 45 |
| COMPANY A | 4 | 1 | 300 | 70 | 4 | 72 |

| USER PERSONAL INFORMATION | | | | | | |
|---|---|---|---|---|---|---|
| READER | SEX | AGE | OCCUPATION | AREA | MAIL | OTHER |
| SATO | FEMALE | 20 | | | | |
| SUZUKI | MALE | 30 | | | | |
| TANAKA | MALE | 25 | | | | |
| SAITO | FEMALE | 50 | | | | |

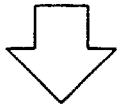

ANALYSIS RESULT (SAMPLE 1)

| ARTICLE | AGE | | | | | |
|---|---|---|---|---|---|---|
| | 10's | 20's | 30's | 40's | 50's | |
| 1-1 | 30 | 35 | 60 | 50 | 30 | |
| 1-2 | 40 | 30 | 35 | 30 | 30 | DEVIATION |
| 3-1 | 60 | 30 | 40 | 30 | 35 | |
| 4-1 | 30 | 30 | 50 | 70 | 60 | |

ANALYSIS RESULT (SAMPLE 2)

| ARTICLE | REFERRER | | | | | |
|---|---|---|---|---|---|---|
| | SATO | SUZUKI | TANAKA | SAITO | HARRIS | |
| 1-1 | 30 | 35 | 60 | 50 | 30 | |
| 1-2 | 40 | 30 | 35 | 30 | 30 | DEVIATION |
| 3-1 | 60 | 30 | 40 | 30 | 35 | |
| 4-1 | 30 | 30 | 50 | 70 | 60 | |

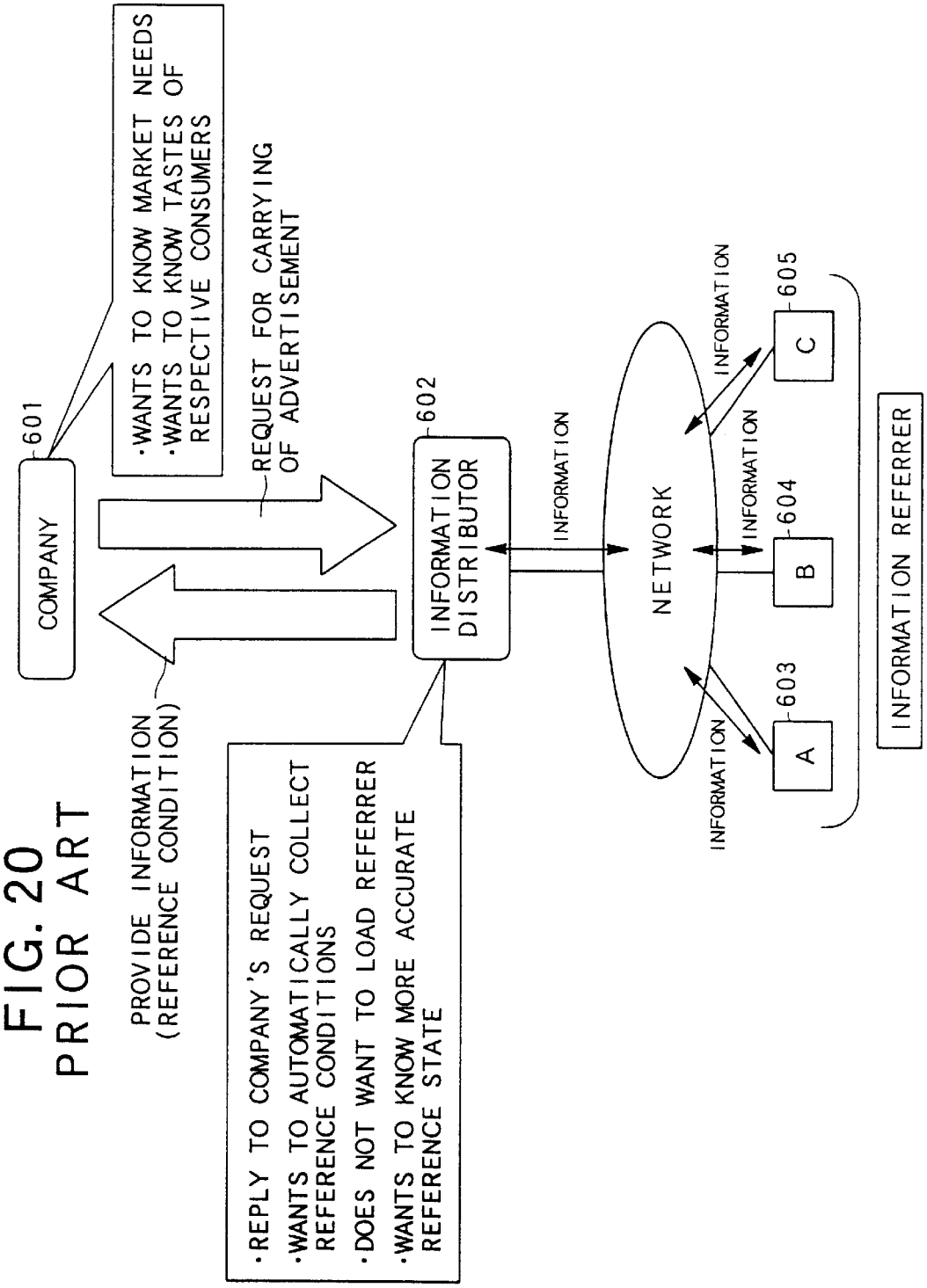

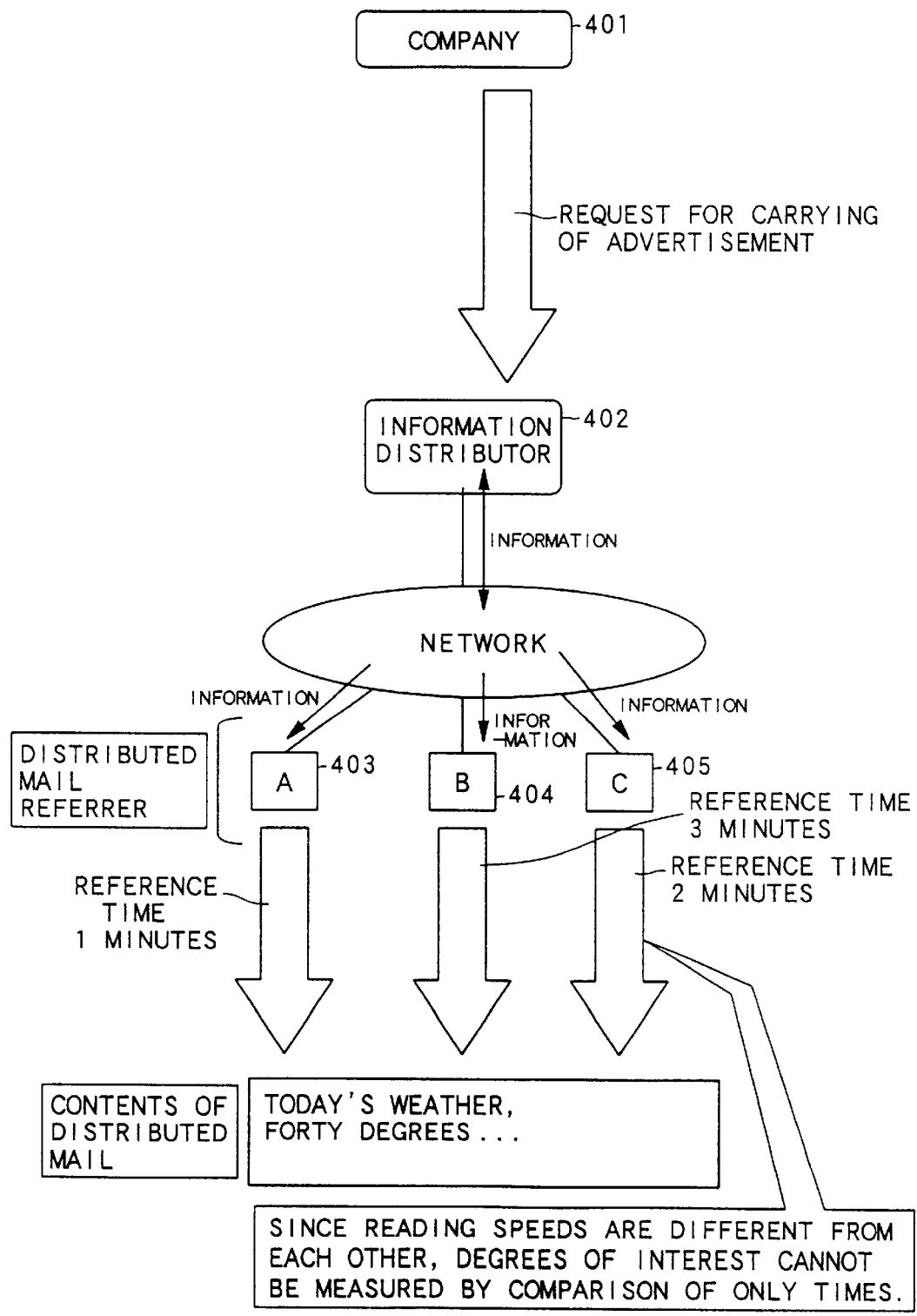

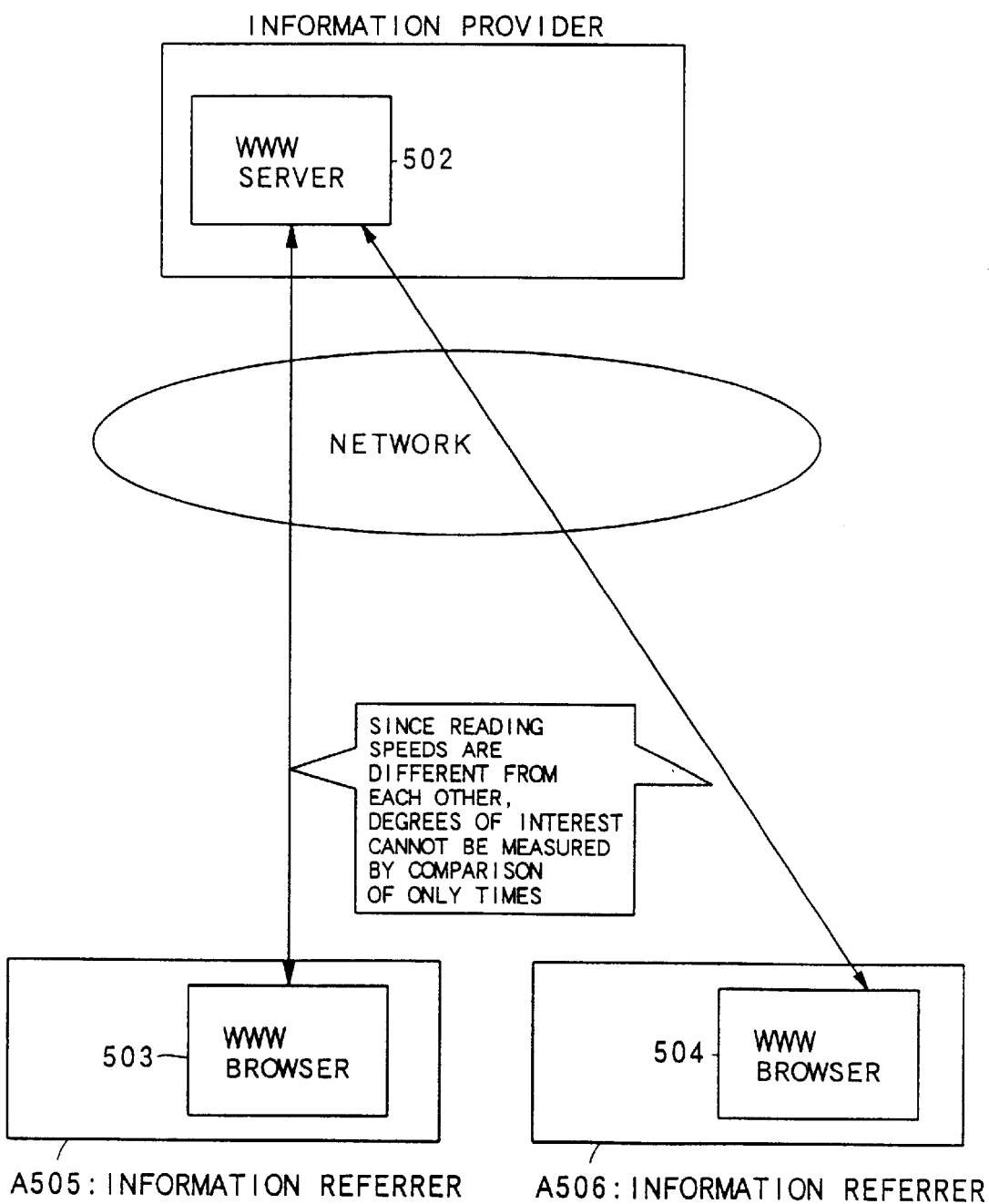

REFERENCE STATE OUTPUT SYSTEM, REFERENCE STATE OUTPUT METHOD, AND COMPUTER READABLE MEDIUM ON WHICH REFERENCE STATE OUTPUT PROGRAM IS RECORDED

BACKGROUND OF THE INVENTION

1. Field of the Invention

The present invention relates to a reference state output system, a reference state output method, and a computer readable medium on which a reference state output program is recorded and, more particularly, to a reference state output system, a reference state output method, and a computer readable medium, on which a reference state output program is recorded, which are preferably applied when the reference state of contents on an electronic mail server or the World Wide Web (to be referred to as WWW hereinafter) server is output.

2. Prior Art

In recent years, with development of networks represented by Internet, it is frequently performed that an information distributor distributes information such as news to a plurality of referrers as broadcast mails or the like on the requests of companies or the like or that pieces of information are disclosed on homepages.

The concepts of relationships among the company, the information distributor, the referrers, and the information will be described below with reference to FIG. 20. FIG. 20 shows a conceptual diagram of the relationships among the company, the information distributor, the referrers, and the information.

As shown in FIG. 20, a company 601 requests the information distributor 602 to carry advertisements on electronic mails or homepages. The company 601 requests an information distributor 602 to provide information related to reference conditions to know market needs and the tastes of respective consumers.

However, the information distributor 602 automatically collect reference states for costs or the like to replay to the request of the company 601, and requires more accurate reference states without loading information referrers 603, 604, and 605.

More specifically, the information distributor 602 must easily and accurately obtain information (to be also referred to as a reference state hereinafter) representing specific contents in which the information referrers 603, 604, and 605 are interested.

For this reason, in a system in which an electronic mail or a homepage is referred to, a more accurate device used to cause the information distributor 602 to know the reference states of the information referrers 603, 604, and 605 is conventionally required.

In the past, when a person who wants to know reference states corrects reference states related to information, the person calculates time for which the information is displayed on a screen to collect the reference conditions.

In this case, it is assumed that the longer the display time of the information is, the more a referrer is interested in the information (article or the like). In this manner, in the prior art, the degree of interest in information can be collected as a reference state.

However, the prior art has the following problem. That is, collected display time of information does not necessarily represent the degree of interest in the information.

More specifically, information carried on an electronic mail or information on a homepage is constituted by a combination of characters and images. For this reason, different information referrers require different times for recognizing the contents the information on the basis of the characters or the images.

Therefore, even if a plurality of persons display the screen for the same time to refer to information, these persons do not necessarily have the same degree of interest in the information.

This point will be described below with reference to FIGS. 21 and 22. FIG. 21 shows a conceptual diagram of reference times of an electronic mail in a prior art, and FIG. 22 shows a conceptual diagram of reference times of a homepage on a WWW server in a prior art.

In the example shown in FIG. 21, a company 401 requests an information distributor 402 to carry an advertisement.

The information distributor 402 uses, as an electronic mail, information (advertisement information) related to the advertisement requested from the company 401. This electronic mail is distributed to a distributed mail referrer A403, a distributed mail referrer B404, and a distributed mail referrer C405 through a network.

Here, it is assumed that the distributed mail referrer A403, the distributed mail referrer B404, and the distributed mail referrer C405 receive electronic mails each having the same contents. It is assumed that the distributed mail referrer A403, the distributed mail referrer B404, and the distributed mail referrer C405 are interested in the advertisement information of the received electronic mails at the same level.

In this case, for example, it is assumed that the distributed mail referrer A403 understands the contents of the advertisement information for 1 minutes, and that the distributed mail referrer B404 understands the contents of the advertisement information for 3 minutes, and that the distributed mail referrer C405 understands the contents of the advertisement information for 2 minutes.

In this manner, since different persons have different speeds at which information is understood, the times required for displaying information to understand the contents of the information are different from each other. Therefore, the degrees of interest in the information cannot be accurately known by comparing the display times with each other.

In addition, as shown in FIG. 22, when a homepage on the WWW server 502 is referred to, the same problem as described above is posed.

In the example shown in FIG. 22, an information referrer A505 and an information referrer B506 refer to the contents of a homepage on the WWW server 502 of an information distributor 501 by using browsers 503 and 504, respectively.

At this time, the information referrers understand the contents of the information from the contents of the homepage at different speeds. Therefore, the degrees of interest in information cannot be accurately known by simply comparing the display times of the information with each other.

SUMMARY OF THE INVENTION

The present invention has been made in consideration of the above circumstances, and has as its object to provide a reference state being capable of accurately outputting the degree of interest in provided information of an information referrer, a reference state output method being capable of accurately outputting the degree of interest in provided information of an information referrer, and a computer readable medium on which a reference state output program being capable of accurately outputting the degree of interest in provided information of an information referrer is recorded.

As described above, according to the present invention, reference times per predetermined number of characters of pieces of information are calculated every person who refers to the information, the reference times per predetermined number of characters for pieces of information are collected, the standard deviation of reference times of each person who refers to the information is calculated. On the basis of the results, as the degree of interest, for example, the deviations of the reference times per predetermined number of characters of pieces of information are calculated, so that the degree of interest in information of the person who refers to the information can be accurately calculated and collected. In addition, in the system of the present invention, parts, i.e., a storage unit, a standard deviation calculation unit, and a degree-of-interest calculation unit may be arranged in one of servers constituting a network, clients such as terminals, and proxy servers.

When the degrees of interest of persons who refer to information and pieces of personal information of the persons are combined to each other, the degrees of interest of groups of persons who refer to information, e.g., pieces of information classified by generations can be totalized.

More specifically, in the present invention, a reference time is acquired every information included in an electronic mail or a homepage, and data are stored for different pieces of information.

The reference state output system, the reference state output method, and the computer readable medium on which the reference state output program is recorded according to the present invention can be applied to a system in which an information distributor provides information to referrers on the request of an information provider such as a company.

In the degree-of-interest calculation unit, the degrees of interest in pieces of information is calculated on the basis of the stored reference states, and the degrees of interest are edited to obtain data classified by articles.

Therefore, the company or the like can accurately know an article in which persons who refer to information are heavily interested (the article can be determined by the magnitudes of deviations).

BRIEF DESCRIPTION OF THE DRAWINGS

FIG. 5 is a flow chart of the operation shown in FIG. 4.

FIG. 6 is a reference state table formed in a reference state storage unit shown in FIG. 4.

FIG. 7 is a table of mail transmission temporary data formed in a temporary data storage unit shown in FIG. 4.

FIG. 9 is a table of distributed mail identification information transmitted to the transceiver unit shown in FIGS. 4 and 5.

FIG. 10 is a flow chart of the operation of a general mail transmission unit shown in FIGS. 4 and 5.

FIG. 16 is a conceptual diagram obtained when reference states are analyzed in the first embodiment of the reference state output system according to the present invention.

FIG. 20 is a conceptual diagram of the relationships among a company, an information distributor, referrers, and information.

FIG. 21 is a conceptual diagram of reference times of an electronic mail in a prior art.

FIG. 22 shows a conceptual diagram of reference times of a homepage on a WWW server in a prior art.

DETAILED DESCRIPTION OF THE PREFERRED EMBODIMENT

First Embodiment

An embodiment in which a reference state output system according to the present invention is applied to an electronic mail distribution system will be described below with reference to the accompanying drawing as the first embodiment. The following description of the first embodiment can also be applied to the description of an embodiment of a reference state output method according to the present invention. Therefore, the following description serves as the description of an embodiment of the reference state output method according to the present invention.

Description of Configuration

Figure 1:
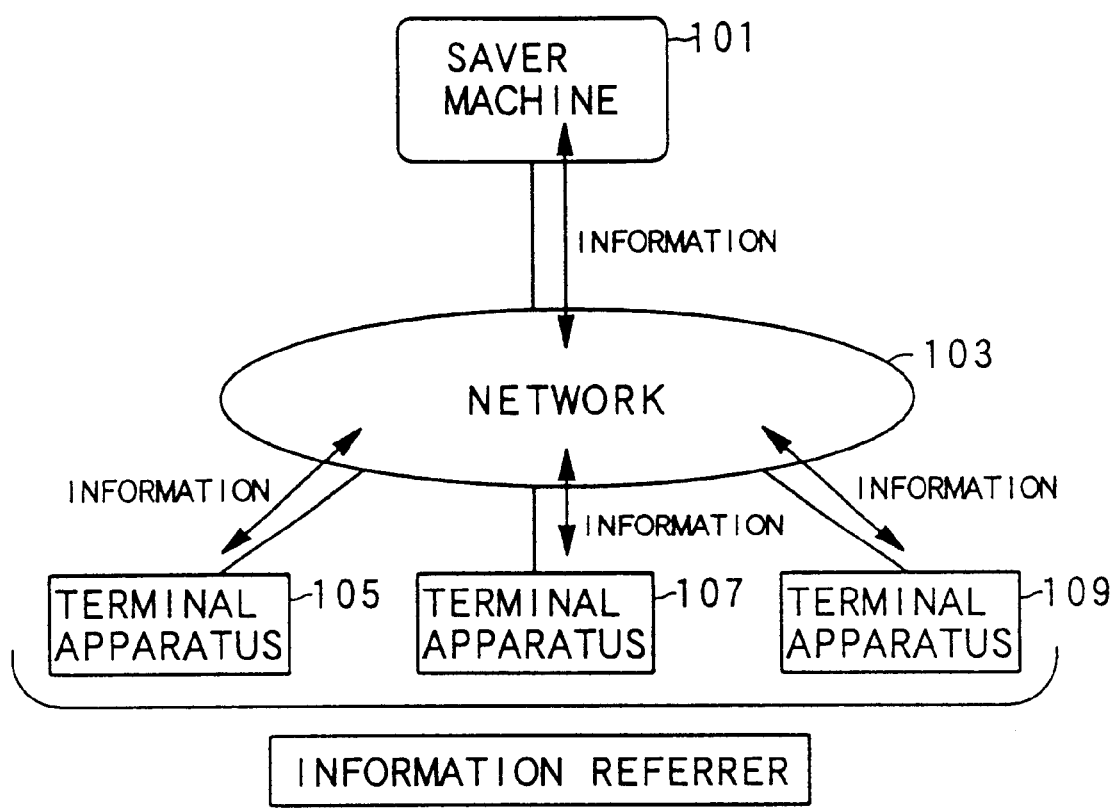
FIG. 1 is an entire schematic diagram of the first embodiment in which a reference state output system according to the present invention is applied to an electronic mail distribution system.

FIG. 1 shows an entire schematic diagram of the first embodiment in which a reference state output system according to the present invention is applied to an electronic mail distribution system.

As shown in FIG. 1, the first embodiment of the reference state output system according to the present invention comprises a server machine 101 and at least one terminal apparatus (three in FIG. 1), i.e., terminal apparatuses 105, 107, and 109, which receive information on an electronic mail (to be also referred to as a mail hereinafter) from the server machine 101 through a network 103.

The number of server machines connected to the reference state output system according to the present invention is not limited to one as shown in FIG. 1, and the number of server machines may be an arbitrary number which is 1 or more.

The server machine 101 is used as an information distributor which distributes information on the request of a company. The terminal apparatuses 105, 107, and 109 are used by information referrers which receive information from the information distributor. More specifically, a server machine may be set for each information distributor, or one server machine may be shared by a plurality of information distributors.

Information shown in FIG. 1 is information carried on an electronic mail transmitted through the network 103, and the contents of the information will be described later. The information distributed from the electronic mail may be free or charged for referring to the electronic mail.

The server machine 101 and the terminal apparatuses 105, 107, and 109 will be described below with reference to FIGS. 2 and 3.

Figure 2:
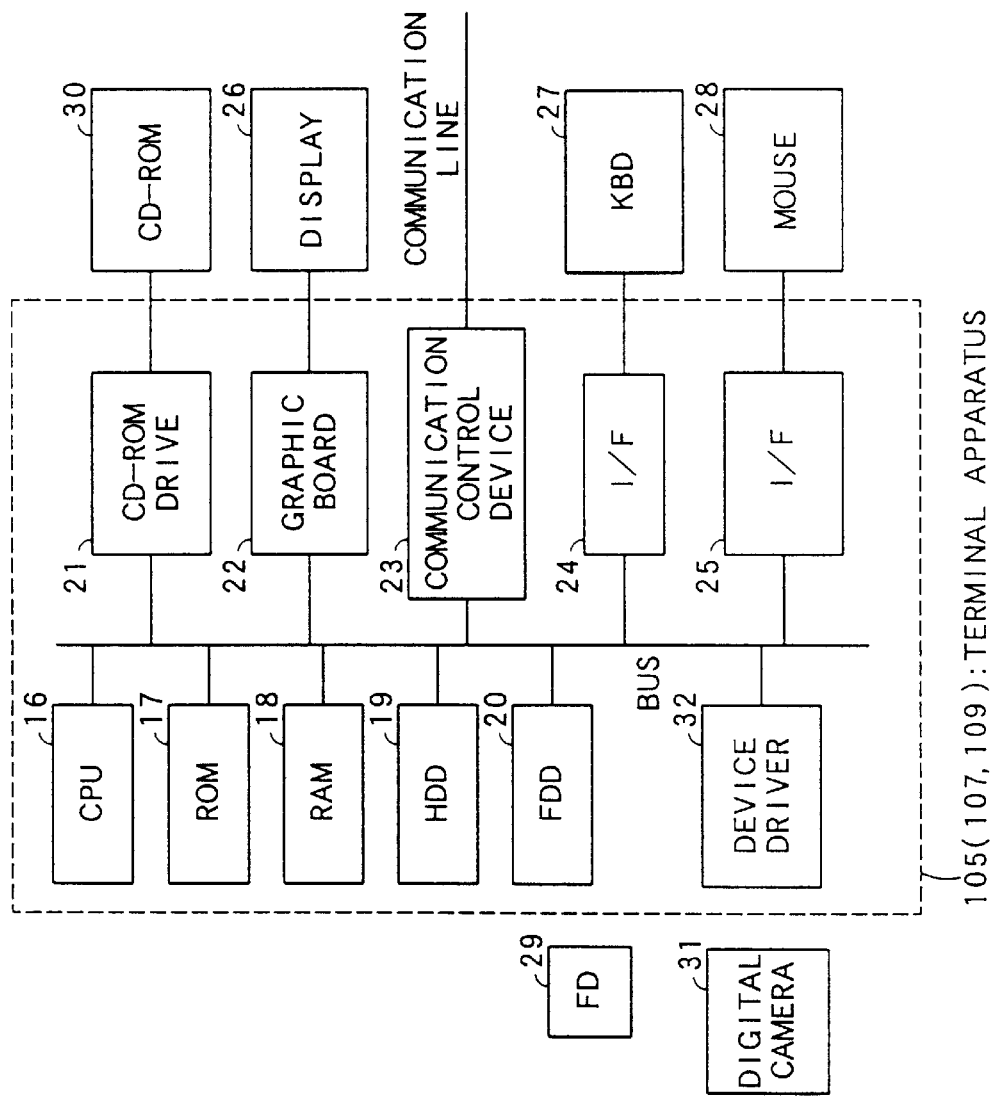
FIG. 2 is a block diagram of a terminal apparatus shown in FIG. 1.
Figure 3:
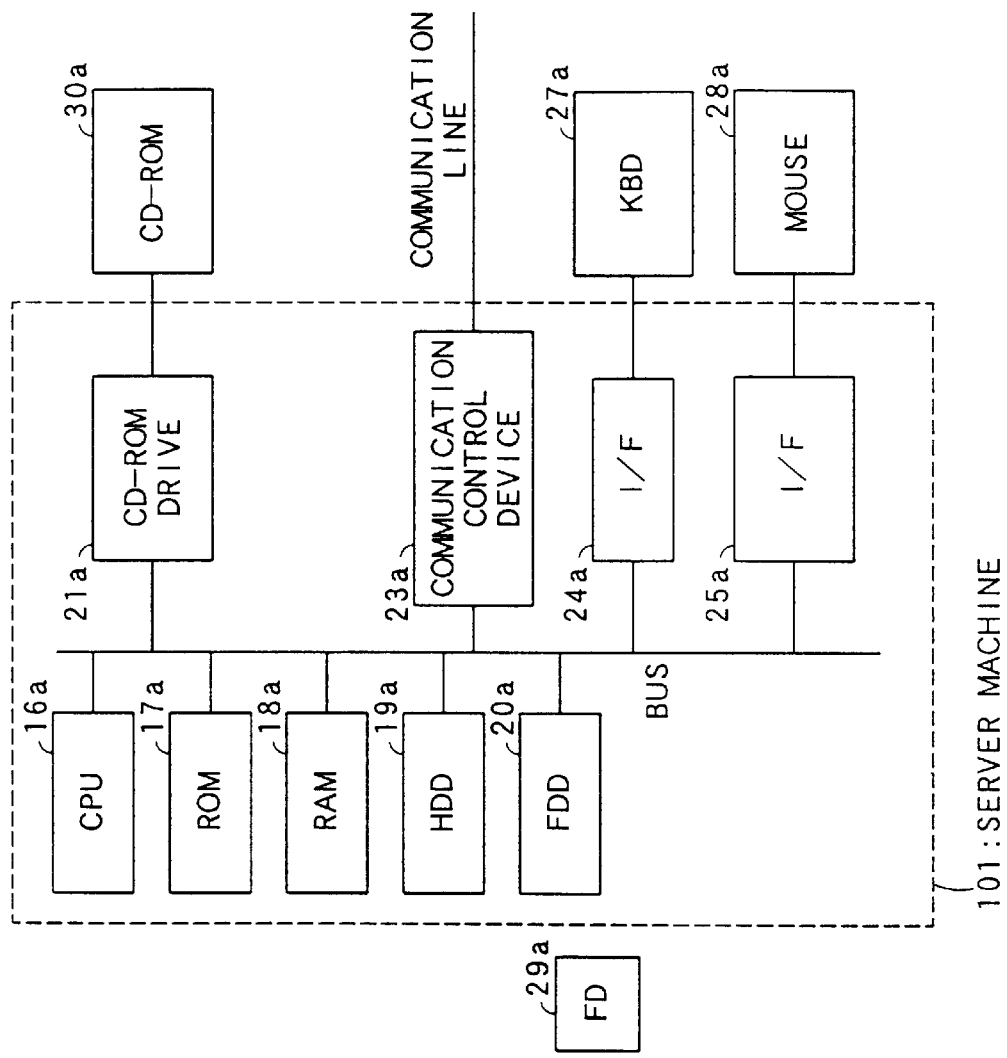
FIG. 3 is a block diagram showing a server machine shown in FIG. 1.

FIG. 2 is a block diagram of the terminal apparatus 105 (107 or 109) shown in FIG. 1, and FIG. 3 is a block diagram of the server machine 101 shown in FIG. 1.

Referring to FIG. 2, the terminal apparatus 105 (107, 109) comprises a CPU (Central Processing Unit) 16, a ROM (Read Only Memory) 17, a RAM (Random Access Memory) 18, a hard disk drive (HDD) 19 (including a hard disk), a floppy disk drive (FDD) 20, a CD-ROM drive 21, a graphic board 22, a communication control device 23, interface circuits (I/Fs) 24 and 25, and a device driver 32 which are connected to each other through a bus (BUS).

A display 26 such as a cathode ray tube (CRT) or a liquid-crystal display (LCD) is connected to the graphic board 22 as a display device according to the present invention.

The graphic board 22 operates together with the CPU 16 to operate as a display control unit according to the present invention.

A keyboard (KBD) 27 is connected to the I/F 24. A mouse 28 and a pointing device such as a track ball, a flat space, or a joy stick are connected to the I/F 25. In addition, a digital camera 31 is connected to the device driver 32.

The ROM 17 stores a starting program therein. The starting program is executed by the CPU 16 when the power supply of the terminal apparatus 105 (107, 109) is turned on. In this manner, an operating system (OS) stored in the HDD 19 and a single driver or a plurality of drivers for a display process or a communication process are loaded on the RAM 18, and various processes or controls can be executed.

In the RAM 18, a program for controlling the terminal apparatus 105 (107, 109) is developed, and the processing results obtained by the program, temporary data for processing, display data for displaying the processing results on the screen of the display 26, and the like are held. The RAM 18 is used as a work area of the CPU 16.

The display data developed on the RAM 18 is transmitted to the display 26 through the graphic board 22, and the display 26 displays the display contents (text, image, and the like) corresponding to the display data on the screen.

The HDD 19 is a device which records or reads a program, control data, text data, image data, and the like on/from the hard disk according to an instruction of the CPU 16.

In this case, the hard disk included in the HDD 19 holds an application program for causing the terminal apparatus 105 (107, 109) to function as the reference state output system according to the present invention and data used for executing the program.

More specifically, the hard disk corresponds to a computer readable medium on which the reference state output program according to the present invention is recorded. In place of the hard disk, an FD 29 or a CD-ROM 30 may be used as a computer readable medium on which the reference state output program according to the present invention is recorded.

The FDD 20 is a device which records or reads a program, control data, text data, image data, and the like on/from the FD 29 according to an instruction of the CPU 16.

The CD-ROM drive 21 is a device for reading a program or data recorded on the CD-ROM (read only memory using a compact disk) 30 according to an instruction of the CPU 16.

The communication control device 23 transmits/receives data to/from another device or downloads a program or data by using a communication line connected to the terminal apparatus 105 (107, 109) according to an instruction of the CPU 16.

The KBD 27 comprises a plurality of keys (character input keys, cursor keys, and the like), and are used when an operator inputs data in the terminal apparatus 105 (107, 109). The mouse 28 is used to input a selection instruction using a displayed mouse cursor on the display 26.

The digital camera 31 photographs a static image serving as an object to be photographed. The digital camera 31 may be a digital video camera. As the digital camera 31, a digital camera in which photographing can be performed in an image size of 640 dots in width×400 dots in height or larger is preferably used. The device driver 32 controls the operation of the digital camera 31 according to an instruction of the CPU 16.

The CPU 16 executes the various programs stored in the ROM 17, the HDD 19, the FD 29, and the CD-ROM 30 corresponding to the storage units and the storage media of the present invention to give instructions to constituent elements in the terminal apparatus 105 (107, 109), and controls the operations of the terminal apparatus 105 (107, 109) and the peripheral device.

The programs or the data held in the recording media such as the hard disk and the like may be held in advance. Programs or data downloaded from another device may be held in the hard disk.

All the constituent elements shown in FIG. 2 are not necessary constituent elements for the present invention. For example, the CD-ROM drive 21, the CD-ROM 30, and the digital camera 31 shown in FIG. 2 can be omitted.

The server machine 101 shown in FIG. 1 will be described below with reference to FIG. 3. As shown in FIG. 3, the server machine 101 shown in FIG. 1 has the same configuration as that of the terminal apparatus 105 (107, 109) shown in FIG. 2 except that the server machine 101 does not comprise the graphic board 22, the display 26, the CD-ROM 30, and the device driver 32.

Referring to FIG. 3, the server machine 101 comprises a CPU (Central Processing Unit) 16a, a ROM (Read Only Memory) 17a, a RAM (Random Access Memory) 18a, a hard disk drive (HDD) 19a (including a hard disk), a floppy disk drive (FDD) 20a, a CD-ROM drive 21a, a communication control device 23a, and interface circuits (I/Fs) 24a and 25a which are connected to each other through a bus (BUS).

A keyboard (KBD) 27a is connected to the I/F 24a. A mouse 28a and a pointing device such as a track ball, a flat space, or a joy stick are connected to the I/F 25a.

The RoM 17a stores a starting program therein. The starting program is executed by the CPU 16a when the power supply of the server machine 101 is turned on. In this manner, an operating system (OS) stored in the HDD 19a and a single driver or a plurality of drivers for a display process or a communication process are loaded on the RAM 18a, and various processes or controls can be executed.

In the RAM 18a, a program for controlling the terminal apparatus server machine 101 is developed, and the processing results obtained by the program and temporary data for processing are held. The RAM 18a is used as a work area of the CPU 16a.

The HDD 19a is a device which records or reads a program, control data, text data, image data, and the like on/from the hard disk according to an instruction of the CPU 16a.

In this case, the hard disk included in the HDD 19a holds an application program for causing the server machine 101 to function as the reference state output system according to the present invention and data used for executing the program.

More specifically, the hard disk corresponds to a computer readable medium on which the reference state output program according to the present invention is recorded. In place of the hard disk, an FD 29a or a CD-ROM 30a may be used as a computer readable medium on which the reference state output program according to the present invention is recorded.

The FDD 20a is a device which records or reads a program, control data, text data, image data, and the like on/from the floppy disk (FD) 29a according to an instruction of the CPU 16a.

The CD-ROM drive 21a is a device for reading a program or data recorded on the CD-ROM (read only memory using a compact disk) 30a according to an instruction of the CPU 16a.

The communication control device 23a transmits/receives data to/from another device or downloads a program or data by using a communication line connected to the server machine 101 according to an instruction of the CPU 16a.

The KBD 27a comprises a plurality of keys (character input keys, cursor keys, and the like), and are used when an operator inputs data in the server machine 101. The mouse 28a is used to input a selection instruction using a mouse cursor.

The CPU 16a executes the various programs stored in the ROM 17a, the HDD 19a, the FD 29a, and the CD-ROM 30a corresponding to the storage units and the storage media of the present invention to give instructions to constituent elements in the server machine 101, and controls the operations of the terminal server machine 101 and the peripheral device.

The programs or the data held in the recording media such as the hard disk and the like may be held in advance. Programs or data downloaded from another device may be held in the hard disk.

All the constituent elements shown in FIG. 3 are not necessary constituent elements for the present invention.

For example, the CD-ROM drive 21a and the CD-ROM 30a shown in FIG. 3 can be omitted.

Description of Operation

Figure 4:
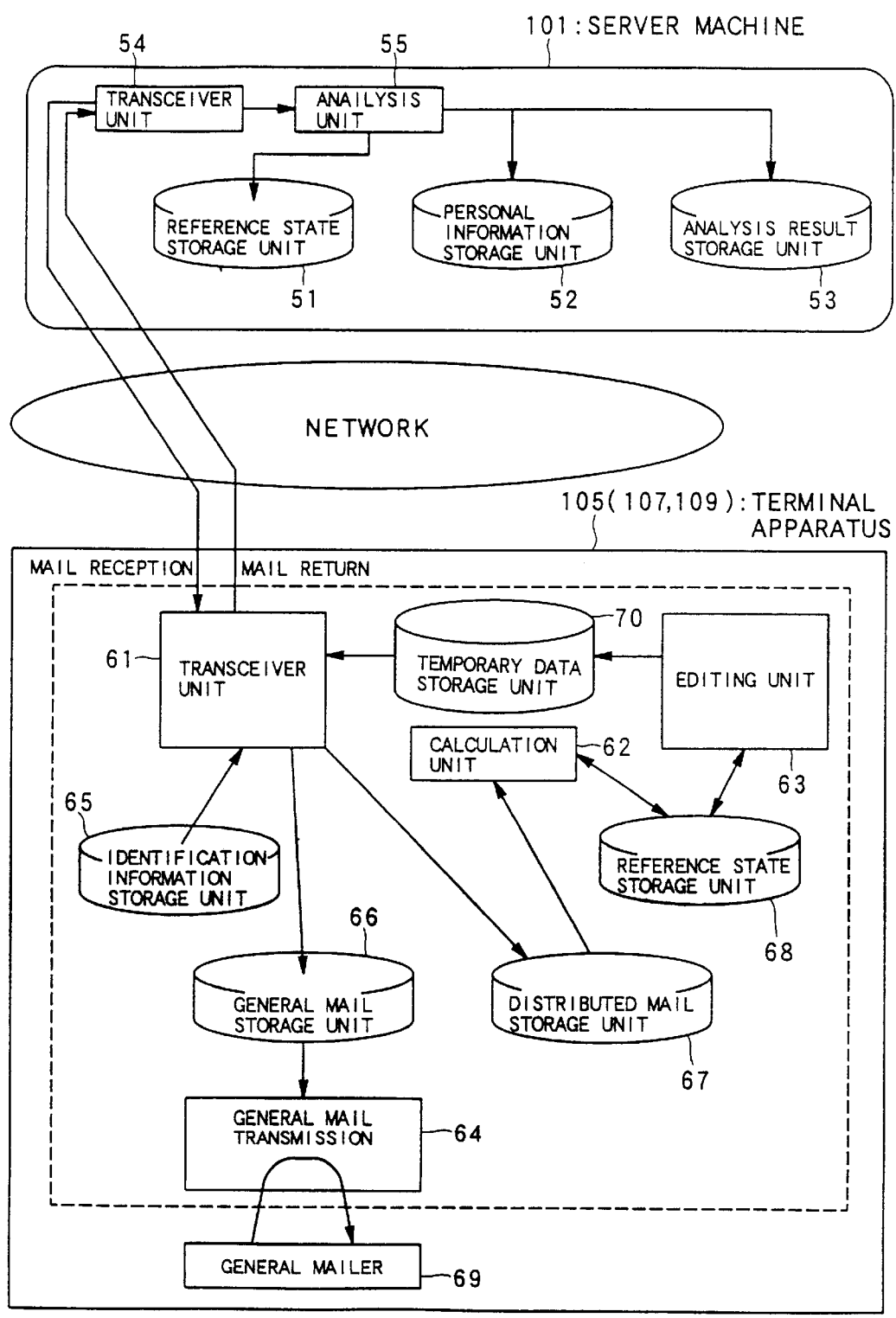
FIG. 4 is a diagram showing an operational principle of the first embodiment of the reference state output system according to the present invention.

The operation of the first embodiment of the reference state output system, having the above configuration, according to the present invention will be described below with reference to the accompanying drawings. FIG. 4 shows a diagram showing an operational principle of the first embodiment of the reference state output system according to the present invention.

Referring to FIG. 4, each terminal apparatus 105 (107, 109) functions as a device comprising a transceiver unit 61, a calculation unit 62, an editing unit 63 serving as a degree-of-interest calculation unit according to the present invention, a general mail transmission unit 64, an identification information storage unit 65, a general mail storage unit 66, a distributed mail storage unit 67, a reference state storage unit 68, a general mailer 69, and a temporary data storage unit 70 such that the CPU (see FIG. 2) executes a program recorded on a computer readable medium.

In the terminal apparatus 105 (107, 109), the transceiver unit 61 is connected to the identification information storage unit 65, the general mail storage unit 66, the distributed mail storage unit 67, and the temporary data storage unit 70.

The transceiver unit 61 operates as a transmission unit according to the present invention, an acquisition unit serving as a receiving unit, and a determination unit.

The identification information storage unit 65 is connected to the transceiver unit 61.

The general mail storage unit 66 is connected to the transceiver unit 61 and the general mail transmission unit 64.

The distributed mail storage unit 67 is connected to the transceiver unit 61 and the calculation unit 62. The distributed mail storage unit 67 operates as an information storage unit according to the present invention.

The calculation unit 62 is connected to the distributed mail storage unit 67 and the reference state storage unit 68. The calculation unit 62 operates a standard deviation calculation unit and a reference time calculation unit according to the present invention.

The reference state storage unit 68 is connected to the calculation unit 62 and the editing unit 63. The reference state storage unit 68 operates as a storage unit according to the present invention.

The editing unit 63 is connected to the reference state storage unit 68 and the temporary data storage unit 70. The editing unit 63 operates as a degree-of-interest calculation unit according to the present invention.

The temporary data storage unit 70 is connected to the editing unit 63 and the transceiver unit 61.

Here, the transceiver unit 61 shown in FIG. 4 is a function realized by the CPU 16 and the communication control device 23 which are shown in FIG. 2.

The calculation unit 62 shown in FIG. 4 is a function realized by the CPU 16 and the graphic board 22 which are shown in FIG. 2.

The editing unit 63 shown in FIG. 4 is a function realized by the CPU 16 shown in FIG. 2.

The general mail transmission unit 64 shown in FIG. 4 is a function realized by the CPU 16 shown in FIG. 2.

Data stored in the identification information storage unit 65, the general mail storage unit 66, the distributed mail storage unit 67, the reference state storage unit 68, and the temporary data storage unit 70 which are shown in FIG. 4 can be formed on the RAM 18, the HDD 19, and the FD 29 which are shown in FIG. 2.

On the other hand, in the server machine 101, a transceiver unit 54 is connected to the transceiver unit 61 through a network, and is also connected to an analysis unit 55 inside the server machine 101.

The analysis unit 55 is connected to a reference state storage unit 51, a personal information storage unit 52, and an analysis result storage unit 53. The analysis unit 55 operates as an analysis unit according to the present invention.

In the server machine 101 shown in FIG. 4, the transceiver unit 54 is realized by the CPU 16a and the communication control device 23a shown in FIG. 3.

The analysis unit 55 shown in FIG. 4 is realized by the CPU 16a shown in FIG. 3.

The reference state storage unit 51, the personal information storage unit 52, and the analysis result storage unit 53 which are shown in FIG. 4 are realized by the RAM 18a, the HDD 19a, and the FD 29a which are shown in FIG. 3.

The operational principle of the first embodiment of the reference state output system according to the present invention will be described below with reference to FIG. 4.

In FIG. 4, the transceiver unit 61 receives an electronic mail transmitted from the server machine 101. The transceiver unit 61 classifies the received mail as a general mail or a distributed mail on the basis of identification information held in the identification information storage unit 65. The transceiver unit 61 transmits mail transmission temporary data held in the temporary data storage unit 70 to the server machine 101.

The calculation unit 62 performs a display process of a distributed mail to the display 26, calculates deviation calculation data including a reference time (to be also referred to as a "reference state") of each information carried on the mail, and stores the deviation calculation data in the reference state storage unit 68.

The editing unit 63 edits the mail transmission temporary data serving as reference state information according to the present invention by using the deviation calculation data stored in the reference state storage unit 68 and stores the mail transmission temporary data in the temporary data storage unit 70.

The general mail transmission unit 64 transmits a general mail to the general mailer 69 which is conventional software for reading mails. This general mail is a mail except for a distributed mail. The distributed mail is a mail which is distributed by an information distributor and should investigate the degree of interest in information.

The identification information storage unit 65 stores distributed mail identification information for classifying a mail received by the transceiver unit 61 as a general mail and a distributed mail.

The general mail storage unit 66 stores a general mail output from the transceiver unit 61.

The distributed mail storage unit 67 stores a distributed mail output from the transceiver unit 61.

The reference state storage unit 68 holds a reference state table 68a (see FIG. 6), and the deviation calculation data output from the calculation unit 62 is stored in the reference state table 68a.

The temporary data storage unit 70 stores the mail transmission temporary data output from the editing unit 63.

On the other hand, the server machine 101 functions as a device comprising the reference state storage unit 51, the personal information storage unit 52, the analysis result storage unit 53, the transceiver unit 54, and the analysis unit 55 such that the CPU 16a (see FIG. 3) executes a program.

The transceiver unit 54 of the server machine 101 receives mail transmission temporary data from the terminal apparatus 105 (107, 109) by an electronic mail. The analysis unit 55 stores the temporary data in the reference state storage unit 51 as reference state information.

The analysis unit 55 of the server machine 101 analyzes the reference state information stored in the reference state storage unit 51 by using personal information stored in the personal information storage unit 52, and stores the analysis results in the analysis result storage unit 53. The analysis results stored in the analysis result storage unit 53 are provided to a company or the like as data representing the degree of interest of a referrer.

The transceiver unit 54 outputs a mail received from the transceiver unit 61 of the terminal apparatus 105 (107, 109) to the analysis unit 55. The analysis unit 55 calculates analysis results on the basis of the information stored in the reference state storage unit 51 and the information stored in the personal information storage unit 52, and stores the analysis results in the analysis result storage unit 53.

The operational principle shown in FIG. 4 will be described below with reference to the flow chart. FIG. 5 shows the flow chart of the operation shown in FIG. 4.

In FIG. 5, of the operation principle shown in FIG. 4, the operations of required constituent elements, the flow of data, and the flow of basic processes are shown. Here, the operation principle will be explained as an example of the terminal apparatus 105. The terminal apparatuses 107 and 109 perform the same operation as that of the terminal apparatus 105.

The editing unit 63 of the terminal apparatus 105 searches the reference state storage unit 68. At this time, when deviation calculation data for forming mail transmission temporary data to be transmitted to the server machine 101 is stored in the reference state storage unit 68, the editing unit 63 edits the mail transmission temporary data from the deviation calculation data stored in the reference state storage unit 68 and stores the edited mail transmission temporary data in the temporary data storage unit 70 (step S1).

The transceiver unit 61 transmits a mail to the server machine 101, and receives a mail from the server machine 101 (step S2). For example, when mail transmission temporary data to be transmitted to the server machine 101 is stored in the temporary data storage unit 70, the transceiver unit 61 performs warning (to be described later) (step S4) and then transmits a mail including the temporary data to the server machine 101 (step S2).

When the transceiver unit 61 receives a mail from the server machine 101, the transceiver unit 61 classifies the mail as one of a general mail and a distributed mail (step S2).

When a received electronic mail is a distributed mail, the transceiver unit 61 stores the distributed mail in the distributed mail storage unit 67.

The calculation unit 62 displays the distributed mail and calculates deviation calculation data. The calculation unit 62 stores the calculated deviation calculation data in the reference state storage unit 68 such that the distributed mail is read from the distributed mail storage unit 67 as needed.

The editing unit 63 performs the operation in step S5 by using the deviation calculation data stored in the reference state storage unit 68.

Thereafter, the transceiver unit 61 transmits the mail transmission temporary data stored in the temporary data storage unit 70 to the server machine 101 (step S2).

When an electronic mail including mail transmission temporary data is transmitted to the server machine 101, the transceiver unit 61 gives a mail referrer who refers to the distributed mail a warning that the mail transmission temporary data is transmitted to the mail distributor by using the terminal apparatus 105 (step S4).

This is because data related to a mail referrer is prevented from being transmitted to the outside while the mail referrer is unaware of the transmission.

If the mail referrer refuses to transmit mail transmission temporary data to a mail distributor in response to the warning, the transmission is prohibited.

In this case, the reference state and the mail transmission temporary data will be described below with reference to FIGS. 6 and 7.

FIG. 6 shows a reference state table (to be also referred to as a "table") 68a formed in the reference state storage unit 68 shown in FIG. 4. The reference state table 68a is formed in a work area of the RAM 18, the HDD 19, or the like by the calculation unit 62.

As shown in FIG. 6, the reference state table 68a is constituted by a plurality of records. In each record, deviation calculation data formed for each information to which a mail referrer refers is registered. The record (reference state record) in which the deviation calculation data is registered is constituted by items, i.e., "distributor", "mail number", "article number", "the number of characters", "reference time", "reference count", "expected date of deletion", and "update display".

The "distributor" means a mail distributor (information distributor). As examples of the "distributor", companies A to D are set. Here, the number of mail distributors is not limited to four companies, i.e., company A, company B, company C, and company D as shown in FIG. 6, and arbitrary number of mail distributors may be set.

The "mail number" means a number which is given to a mail of a distributor by the distributor and which is unique in the distributor.

The "article number" means a number which is given to an article in one mail and which is unique in the mail.

The "reference time" means time per one character for which a referrer sees the corresponding article.

The "reference count" means the number of times which referrer sees the corresponding article.

The "expected date of deletion" is a date determined by a mail distributor for each article, and means that a period for which information is required is designated. Response (=degree of interest in information) from information (=distributed mail) provided by a company must be required within a predetermined period of time. A limit required by the company (expected date of deletion shown in FIG. 6) is set on a distributed mail, and the mail distributor distributes the mail to a referrer.

The "update display" is a flag used to check whether the editing unit 63 forms mail transmission temporary data related to the reference state record or not. The flag is set in 1 when an article is referred to, and the flag is set in 0 when the mail is returned to the mail distributor.

FIG. 7 shows a table of mail transmission temporary data formed in the temporary data storage unit 70 shown in FIG. 4. The mail transmission temporary data is formed in a work area (RAM 18) by the process of the editing unit 63. The mail transmission temporary data is held in the temporary data storage unit 70 as records each constituted by a plurality of items, i.e., "distributor", "mail number", "article number", "the number of characters", "reference time, "reference count", and "deviation". The respective records are classified according to distributors. The "deviation" will be described later.

Detailed Description of Operation of Each Constituent Element

The operations of blocks shown in FIGS. 4 and 5 will be further described below in detail.

Operation of Transceiver

Figure 8:
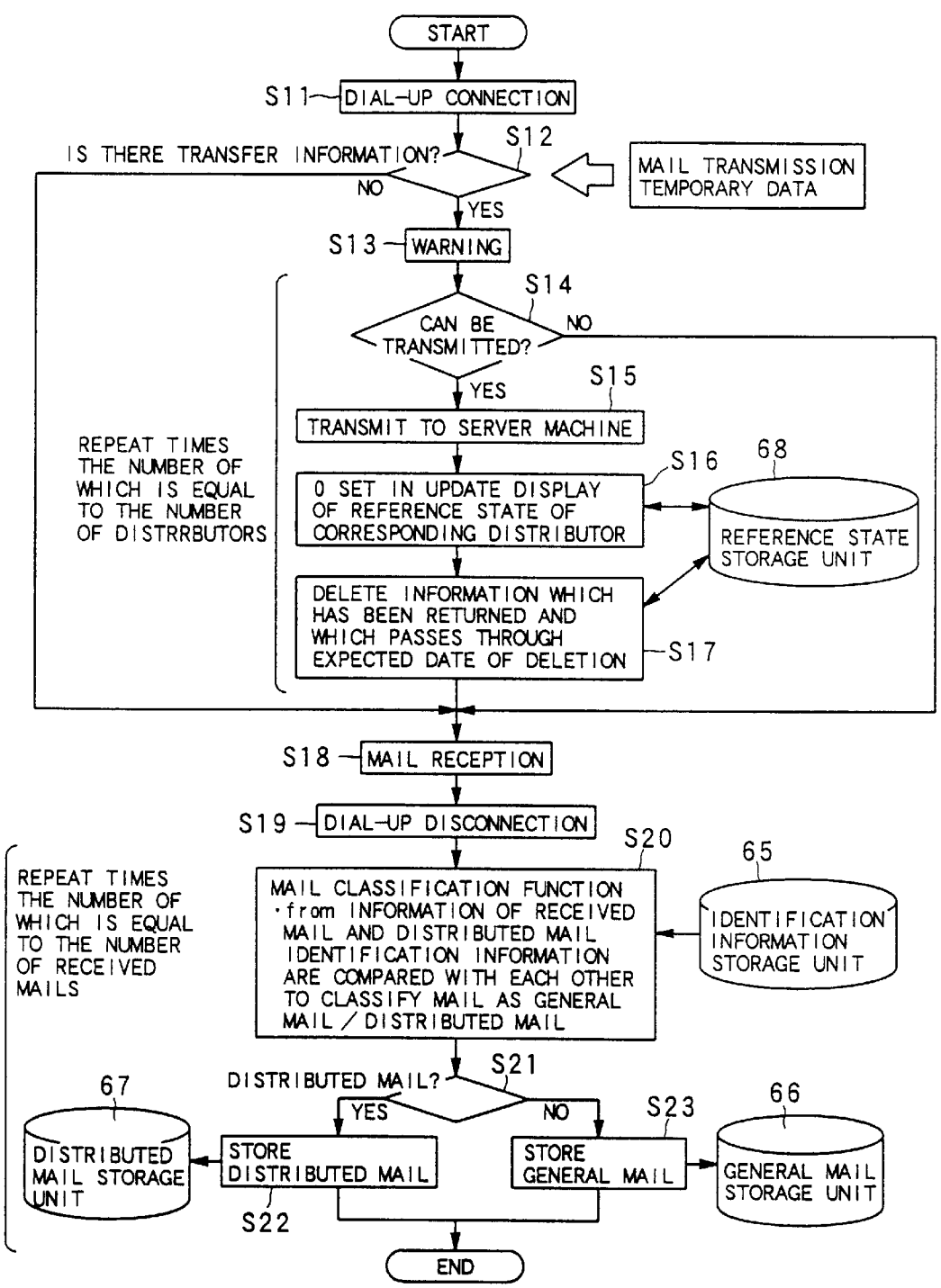
FIG. 8 is a flow chart of the operation of a transceiver unit shown in FIGS. 4 and 5.

The operation of the transceiver unit 61 shown in FIGS. 4 and 5 will be described blow with reference to FIGS. 8 and 9. FIG. 8 shows the flow chart of the operation of the transceiver unit 61 shown in FIGS. 4 and 5, and FIG. 9 shows a table of distributed mail identification information held in the identification information storage unit 65 shown in FIGS. 4 and 5.

As shown in the flow chart shown in FIG. 8, the transceiver unit 61 establishes connection to the server machine 101 by dial-up connection (step S11), and then checks whether mail transmission temporary data to be transmitted to the server machine 101 is in the temporary data storage unit 70 or not (step S12).

At this time, when the mail transmission temporary data exists in the temporary data storage unit 70, the transceiver unit 61 displays, e.g., a warning sentence on the display 26 as a warning for inquiring of a mail referrer whether the transmission can be performed or not.

When the mail referrer inputs the expression of intentions of transmission by using the KBD 27 or the mouse 28 with respect to the warning sentence (step S14, YES), the transceiver unit 61 transmits mail transmission temporary data to be transmitted to the server machine 101 (step S15).

When the mail referrer inputs the expression of intentions of disable transmission within a predetermined period of time or does not input the expression of intentions of disable transmission within the predetermined period of time with respect to the warning sentence (step S14, NO), the transceiver unit 61 does not transmit mail transmission temporary data to be transmitted.

The transceiver unit 61 requests the calculation unit 62 to set "0" in the "update display" (see FIG. 6) of the corresponding reference state record to prevent the mail transmission temporary data which has been transmitted from being transmitted again (step S16).

The transceiver unit 61 deletes a record the reference state of which has been transmitted and which passes through an expected data of deletion from the table in FIG. 7 (step S17)

By this deletion, a reference state which has expired is prevented from being transmitted to a mail distributor each time a mail referrer refers to a distributed mail on the HDD 19.

By deleting the record, an amount of usage of the hard disk of the terminal apparatus 105 (107, 109) used by the mail referrer can be prevented from being increased. Here, the processes in step S12 to step S17 are repeated times the number of which is equal to the number of information distributors.

Thereafter, if a mail addressed to a user which uses the terminal apparatus 105 (107, 109) is in the server machine 101, the transceiver unit 61 receives the mail (step S18).

The transceiver unit 61 receives the mail and then performs dial-up disconnection to end communication with the server machine 101 (step S19). In this embodiment, in order to save the cost of communication of a mail referrer, step S11 to step S19 are set such that time from dial-up connection to dial-up disconnection is minimum.

The transceiver unit 61 discriminates a distributed mail the reference state of which must be investigated from a general mail the reference state of which need not be investigated.

More specifically, a distributed mail and a general mail are classified (step S20).

More specifically, the transceiver unit 61 reads the distributed mail identification information shown in FIG. 9 from the identification information storage unit 65 and compares the identification information with the transmission address of the mail (step S21). The transceiver unit 61 determines a mail the transmission address of which is equal to the identification information or a mail having a specific mail header or the like as a distributed mail (step S21, YES), and determines a mail the transmission address of which is not equal to the identification information as a general mail (step S21, NO).

Thereafter, the transceiver unit 61 stores a distributed mail in the distributed mail storage unit 67 (step S22), and stores a general mail in the general mail storage unit 66 (step S23). Thereafter, the transceiver unit 61 ends its operation.

General Mail Transmission Unit

A case in which the general mail transmission unit 64 shown in FIG. 4 operates in cooperation with the general mailer 69 will be described below with reference to FIG. 10. FIG. 10 shows the flow chart of the operation of the general mail transmission unit 64 shown in FIGS. 4 and 5.

The general mail transmission unit 64 starts the general mailer 69 as shown in step S31 in FIG. 10. Thereafter, the general mail transmission unit 64 which accepts a mail reception request from the general mailer 69 fetches a general mail from the general mail storage unit 66.

This is realized such that the address of a POP3 server on the general mailer is designated to a loop back address (127.0.0.1).

The general mail transmission unit 64 gives the general mail fetched from the general mail storage unit 66 to the general mailer 69.

It is determined according to a setting (delete/not delete after reception) on the general mailer whether a mail which has been fetched in the general mail storage unit 66 is deleted or not.

Operation of Calculation Unit

Figure 11:
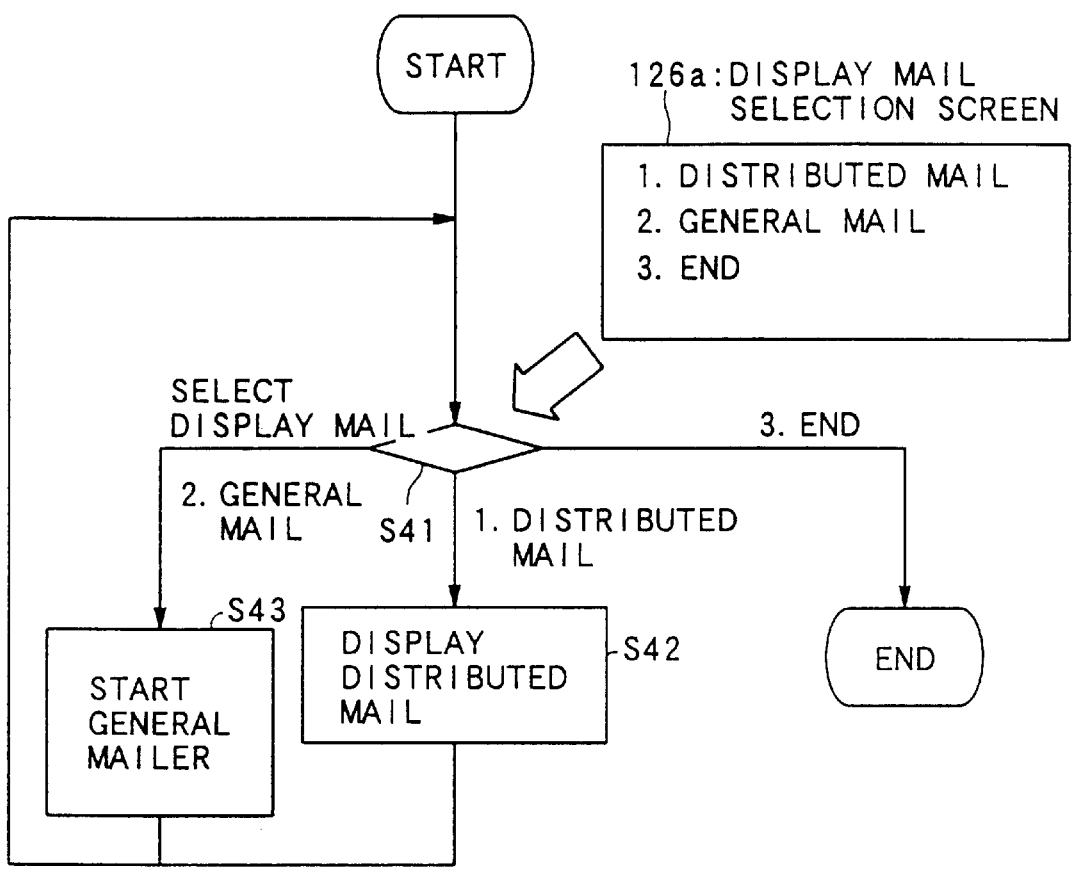
FIG. 11 is a flow chart of the operation of a calculation unit shown in FIGS. 4 and 5.
Figure 12:
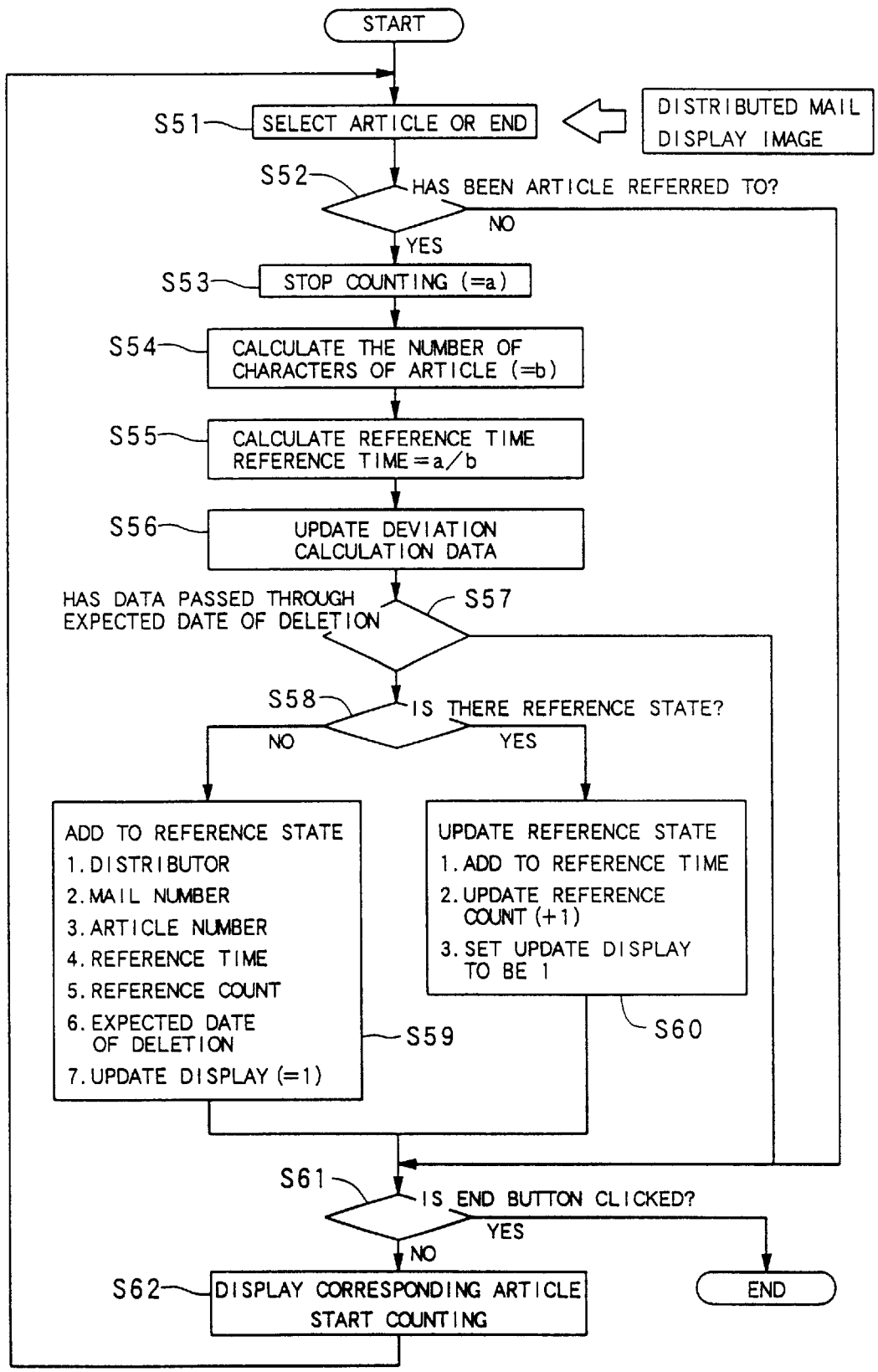
FIG. 12 is a flow chart of the operation of the calculation unit shown in FIGS. 4 and 5.
Figure 13:
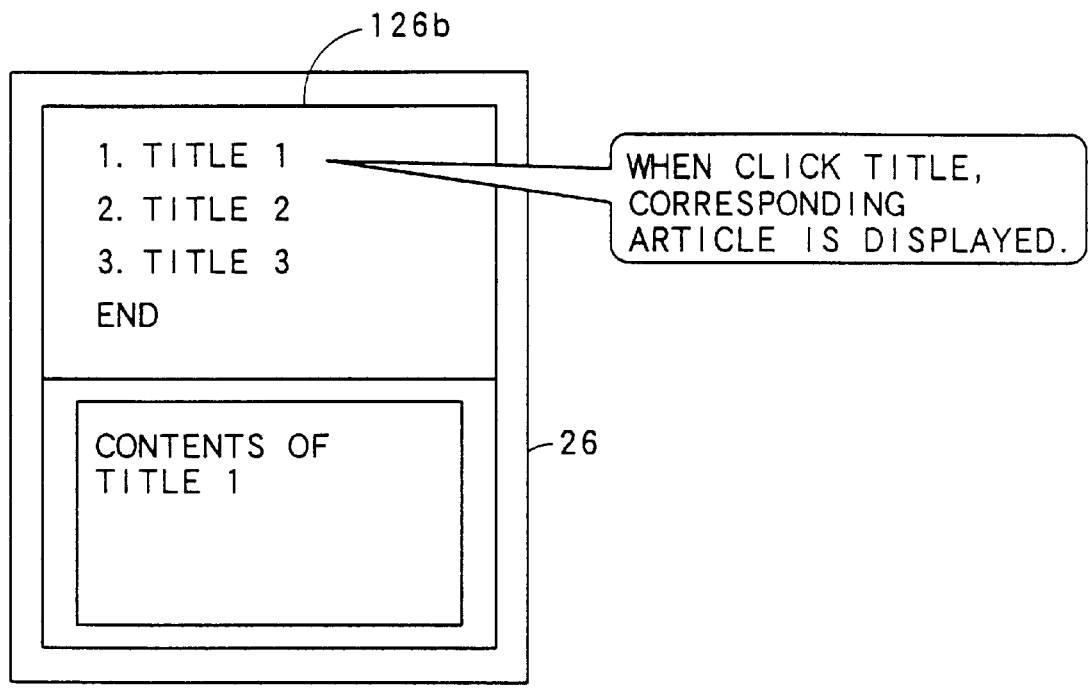
FIG. 13 is a schematic diagram of a display screen which is displayed by the calculation unit shown in FIGS. 4 and 5.

The operation of the calculation unit shown in FIGS. 4 and 5 will be described below with reference to FIGS. 12 and 13. FIGS. 11 and 12 show the flow charts of the operations of the calculation unit 62 shown in FIGS. 4 and 5, and FIG. 13 shows a schematic diagram of a display screen displayed by the calculation unit 62 shown in FIGS. 4 and 5.

A case in which the terminal apparatus 105 (107, 109) receives an electronic mail will be described below with reference to FIG. 11. When the mail referrer refers to the electronic mail received by the terminal apparatus 105 (107, 109), a display mail selection screen is displayed on the display 26.

The mail referrer selects, as a mail to be displayed, one of a distributed mail and a general mail with reference to the display mail selection screen such that the mail referrer selects one of numbers 1 to 3 displayed on the screen by using the KBD 27 or the mouse 28 (step S41).

When the mail referrer selects a general mail as an electronic mail to be displayed (when number 2 is selected) (2. General Mail), as shown in step S31 in FIG. 10, the general mail transmission unit 64 starts the general mailer 69 which is normally used by a mail referrer (step S43).

As shown in FIG. 11, POP3 held by the general mailer 69 can receive a mail from the general mail transmission unit 64 such that an IP address is set to be a loop back address.

When the mail referrer selects a display of a distributed mail in step S41 (when number 1 is selected) (1. Distributed Mail), the calculation unit 62 displays the display screen of the distributed mail on the display 26 (step S42). As shown in FIG. 13, the display screen 126b of the distributed mail displays a tile list of articles representing pieces of information and an end button.

The mail referrer clicks an article title which is desired to be referred to with the mouse 28 on the display screen 126b of the distributed mail to select the article title. On the display screen of the distributed mail, when the mail referrer clicks a title, some or all of the contents of the article corresponding to the selected title are displayed at the lower portion of the display screen. In this embodiment, one piece is carried on one article.

The operation of the calculation unit 62 when the display screen of the distributed mail is displayed on the display 26 will be described below with reference to FIG. 12.

After the mail referrer selects one of an article or the end (step S51), the calculation unit 62 checks whether the mail referrer refers to the information indicated in the article of the distributed mail immediately before the above selection (step S52). This checking method, for example, can be performed such that the CPU 16 checks whether a count value is an initial value or the like.

When the mail referrer refers to a distributed mail (YES), the calculation unit 62 performs the process of collecting a reference state related to the article which is previously referred to evaluate the degree of interest in an article to which the mail referrer refers (step S53).

At this time, as the number of characters included in an article is large, a long time is required to understand the contents of the article. For this reason, it cannot be simply checked by the time for which the article is displayed whether the referrer is interested in the article.

Therefore, the calculation unit 62 in the first embodiment of the reference state output system according to the present invention calculates the time for which the article is displayed, and divides the calculated time by the number of characters included in the article.

An article in which time spent per character is long to display the article is supposed as an article which a referrer is interested, and the calculation unit 62 calculates a display time per character as a reference time (step S55). The reference time is calculated such that the count value obtained by a counter is detected by the calculation unit 62.

More specifically, the calculation unit 62 calculates:

reference time=(count value)/(the number of characters included in, article). The obtained value indicates the reference times shown in FIGS. 6 and 7.

In addition, the reference state output system according to the present invention relatively evaluates the degrees of interest of a mail referrer among articles. For this reason, the editing unit 63 calculates deviations of the degrees of interest in the respective articles. The deviations of the degrees of interest in the respective articles are the deviations shown in FIG. 7.

In the above description, the calculation unit 62 calculates a display time per character as a reference time. The present invention is not limited to the above case, a display time per predetermined number of characters such as two characters or three characters may be calculated as a reference time.

Since the degrees of interest of a mail referrer are relatively evaluated among articles, the editing unit 63 calculates the deviations of the degrees of interest in the articles. The present invention is not limited to the above degrees of interest. For example, a standard deviation itself is used as the degree of interest, or any evaluation measure which can relatively evaluate the degrees of interest of a mail referrer among articles can be arbitrarily used as the degree of interest.

Therefore, the calculation unit 62 stores data (deviation calculation data) which are required by the editing unit 63 to calculate a deviation in the reference state table (see FIG. 6) in the next steps S57 to S60 (step 56).

More specifically, the calculation unit 62 calculates the number of data of reference times, a total of reference times, the average of reference times, a total of reference times 2, a sample variance, and a standard deviation, and overwrites necessary data in the reference state storage unit 68** as deviation calculation data.

Here, although the deviation calculation data is calculated by the calculation unit 62, a deviation itself is calculated by the editing unit 63.

A method of calculating a deviation calculation data by the calculation unit 62 will be described below. Here, "**2" indicates a square".

the number of data (n)=the number of data (n)+1 total of reference time (A)=total of reference times (A)+ reference time average of reference times (B)=A/n total of reference 2 (C)=total of reference time 2 (C)+reference time **2 sample variance (D)=(C−(A**2)/n)/n standard deviation (E)=square root of (D)

The above data are required to calculate the deviation.

However, since the average of reference times B, the sample variance D, and the standard deviation E are derived from the number of data n, the total of reference times A, and the total of reference time 2 C, the calculation unit 62 overwrites the three values, i.e., the number of data n, the total of reference times A, and the total of reference time 2 in the reference state storage unit 68.

As described-above, the deviations of the articles are derived to cause a company or the like which originates an article to check the degree of interest in the article.

However, even if a mail referrer sees an article which passes through a limit to which a company requires the reference state of the article, data such as deviations or the like need not be updated. For this reason, the calculation unit 62 checks the expected date of deletion corresponding to an article held in the reference state table (see FIG. 6) (step S57). When the expected date of deletion has passed, the calculation unit 62 does not update the data.

For this reason, in the reference state table shown in FIG. 6, the item of the expected date of deletion is added to avoid unnecessary updating.

When the display 26 obtains a deviation table corresponding to an article to which a mail referrer refers at first, the display 26 adds a record corresponding to the obtained calculation data to the reference state table. When the mail referrer refers to an article which has been read by the mail referrer again, the display 26 updates the record corresponding to the article in the reference state table.

For this reason, the process performed by the calculation unit 62 changes depending on whether an article to which the mail referrer refers has not been read or has been read. For this reason, the calculation unit 62 checks whether the record corresponding to the corresponding article is included in the reference state table (step S58).

When there is no record corresponding to an article (when the article is referred to at first), the calculation unit 62 adds a record constituted by the following items to the reference state table (step S59).

1. Distributor, 2. Mail number, 3. Article number, 4. Reference time, 5. Reference count (=1), 6. Expected date of deletion, 7. Update display (=1)

On the other hand, when there is a record corresponding to an article, the calculation unit 62 updates the following items in the corresponding record of the reference state table (step S60).

1. reference time, 2. reference count (+1), 3. Update display (=1)

The calculation unit 62 checks whether an end button displayed on the display screen in FIG. 13 is selected by a mail referrer or the like (step S61).

When the end button is selected (YES), the calculation unit 62 ends the process. In contrast to this, when the end button is not selected (NO), i.e., when the title of another article but the end button is selected, the calculation unit 62 displays the article corresponding to the selected title, starts measurement of time by a count for measuring a reference time (step S6), and then returns to step S51.

Operation of Editing Unit

Figure 14:
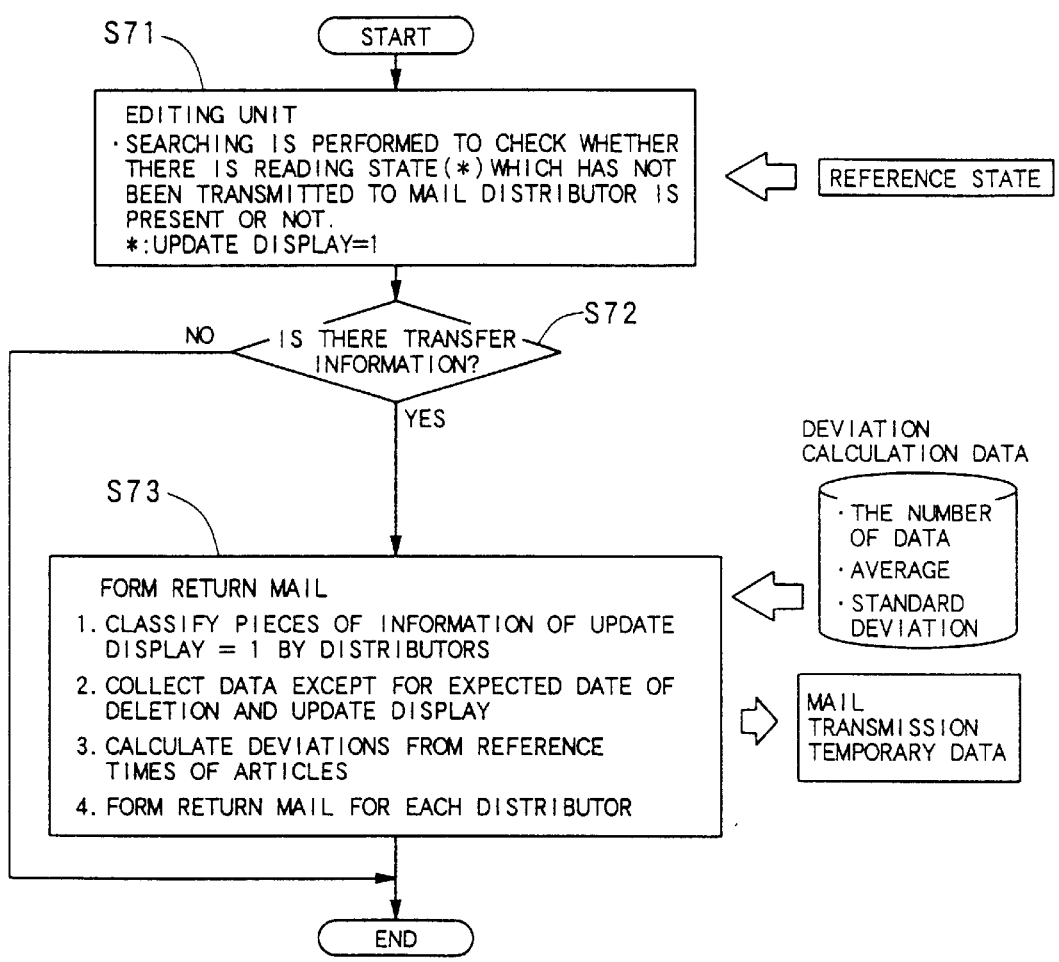
FIG. 14 is a flow chart of the operation of an editing unit shown in FIGS. 4 and 5.

The operation of the editing unit 63 shown in FIGS. 4 and 5 will be described below with reference to FIG. 14. FIG. 14 shows the flow chart of the operation of the editing unit 63 shown in FIGS. 4 and 5.

As described above, the editing unit 63 forms mail transmission temporary data including the deviations of the references times of articles transmitted to a mail distributor (information distributor) with reference to the reference state table formed by the calculation unit 62.

More specifically, as shown in FIG. 14, the editing unit 63 searches the reference state table (see FIG. 6) stored in the reference state storage unit 68 (step S71) to check whether information which has not been transmitted to the mail distributor is present or not (step S72).

This check is performed by referring to "update display" in each record. In the "update display", "1" is set when a record is newly formed or updated, and "0" is set when mail transmission temporary data is formed on the basis of the record and transmitted.

More specifically, the editing unit 63 does not performs the process to the record in which "update display"=0 because it assumed that the mail transmission temporary data corresponding to the record has been formed.

However, when the mail referrer refers to the article corresponding to the record in which "update display"=0, the calculation unit 62 updates the contents of the record and sets "1" in the "update display".

The editing unit 63 extracts a record in which "update display"=1 as a record for forming mail transmission temporary data. Subsequently, the editing unit 63 classifies extracted records by mail distributors (step S73).

At this time, the editing unit 63 extracts the data of items (distributor, mail number, article number, the number of characters, reference time, reference count) required by a mail distributor from each record.

The editing unit 63 calculates a deviation by using deviation calculation data included in each extracted record and the reference time of the article. Here, the editing unit 63 calculates the deviation by using the following equation deviation of reference time=50+(reference time−average of reference times)×10/(standard deviation of reference time)

In the above equation, the calculation is performed by "reference time" used as follows. That is, the maximum value of the reference time is defined in consideration of a case in which an article is left displayed, and the maximum value is used as the reference time when there is a reference time larger than the maximum value. Thereafter, the editing unit 63 adds the calculated deviation to the extracted record as one item. The extracted record to which the deviation is added serves as mail transmission temporary data.

In this manner, the editing unit 63 edits mail transmission temporary data in units of mail distributors, and stores the mail transmission temporary data in the table in the temporary data storage unit 70 shown in FIG. 7. Thereafter, as described above, the transceiver unit 61 refers to the table in the temporary data storage unit 70 as needed to transmit mail transmission temporary data to be transmitted to the server machine 101 as an electronic mail.

Figure 15:
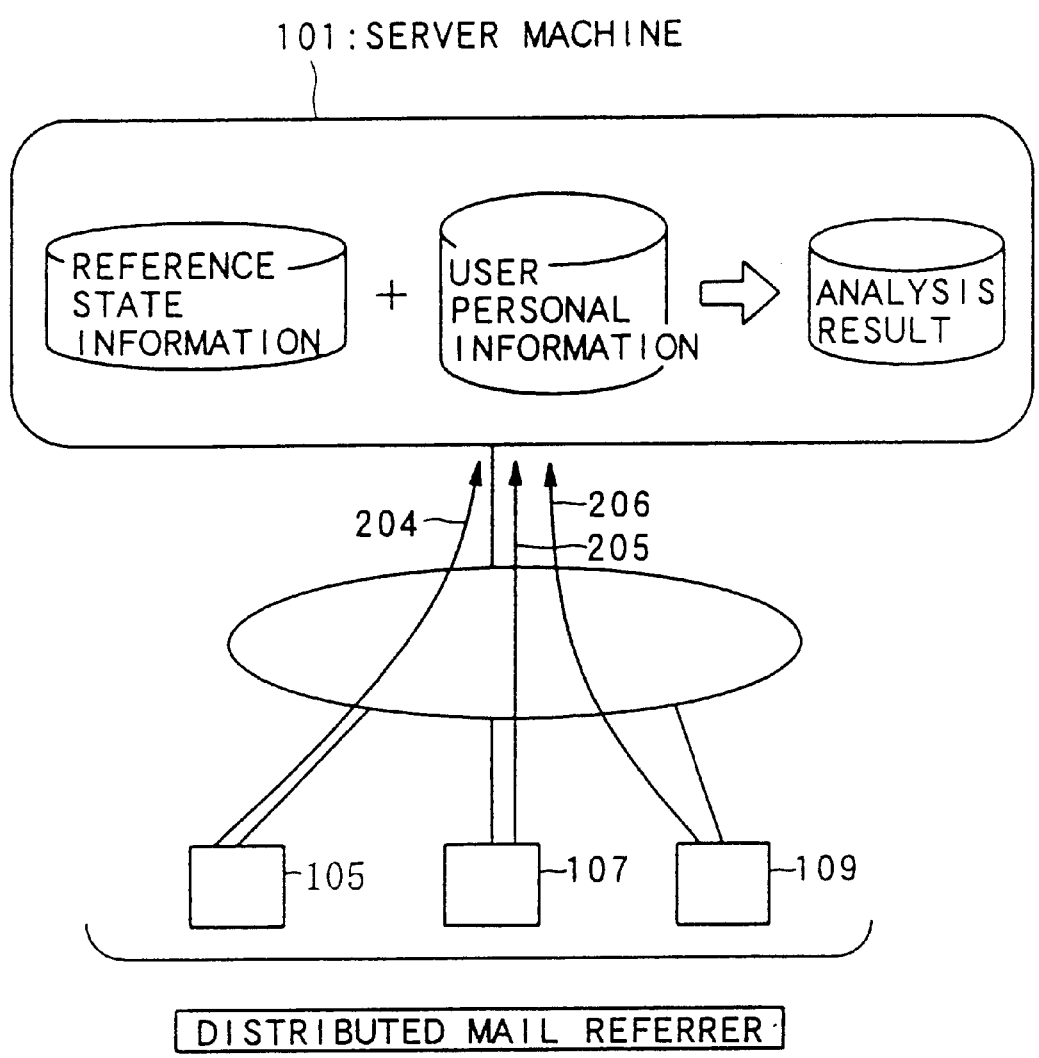
FIG. 15 is a conceptual diagram obtained when a return mail is returned from a distributed mail referrer in the first embodiment of the reference state output system according to the present invention.

As shown in FIG. 15, the terminal apparatuses 105, 107, and 109 return mails 204, 205, and 206 to the server machine 101, respectively.

The server machine 101 which receives the return mails 204, 205, and 206 obtains analysis results on the basis of reference state information obtained from the return mails and user personal information.

Here, FIG. 15 shows a conceptual diagram obtained when a return mail is returned from a distributed mail referrer in the first embodiment of the reference state output system according to the present invention.

The server machine 101 receives reference states from the terminal apparatus 105, 107, and 109, stores these pieces of information, performs totalizing, analysis, and the like, and provides the results to companies.

Analysis of Reference State

The operation for obtaining analysis results in the server machine 101 of a mail distributor shown in FIGS. 4 or 15 will be described below with reference to FIG. 16. FIG. 16 shows a conceptual diagram obtained when reference states are analyzed in the first embodiment of the reference state output system according to the present invention.

The user personal information shown in FIG. 16 can be collected when a user contracts with a mail distributor for the reference of the user personal information.

As the user personal information, for example, names, ages, sexes, occupations, areas including areas in which users reside and areas or the like of other reference positions, mail addresses, hobbies, and the like are used. However, the pieces of information may be arbitrarily added to or deleted from the other item.

An operation for obtaining the analysis results shown in FIG. 16 will be described below. The reference states received by a distributor are prepared for each referrer (one reference state is shown in FIG. 16).

The values of deviations classified by referrers and articles are added to the user personal information.

Analysis results can be obtained on the basis of the table of the user personal information to which the deviations are added.

For example, in order to obtain analysis results classified by ages as analysis results, articles in units of predetermined age ranges (in units of 10 years in FIG. 16) are selected from the table of the user personal information to which the deviations are added to set the articles as analysis results (Analysis Result 1).

In order to obtain analysis results classified by referrers as analysis results, deviations are selected in units of referrers and articles from the user personal information to which the deviations are added to set the deviations as analysis results (Analysis Result 2).

In addition, in order to obtain analysis results in units of sexes, occupations, areas, mail addresses, and hobbies, the analysis results can be obtained by the same manner as described above.

In FIG. 16, article numbers for specifying articles can be also obtained by combinations of mail numbers and article numbers.

On the other hand, the analysis unit 55 of the server machine 101 shown in FIG. 4 stores reference states sent from mail referrers in the reference state storage unit 51.

The analysis unit 55 totalizes data required by a company on the basis of the user personal information and the reference states. For example, as the data required by a company, data representing that persons of which ages frequently see which articles, data representing that persons having which occupations are interested in which articles, and the like are used.

As described above, in the first embodiment of the reference state output system according to the present invention, accurate reference states concerning the degrees of interest with which that referrers refer to pieces of information distributed by electronic mails can be collected.

This is because, in this embodiment, the deviations of reference times of pieces of information can be objectively calculated on the basis of the reference times per character of the pieces of information, and the degrees of interest can be investigated without depending on the numbers of characters in the pieces of information and regardless of the speeds at understanding the pieces of information of the referrers.

In addition, in this embodiment, after the pieces of information are collected, reference states or the like classified by the layers of referrers for the pieces of information are analyzed in cooperation with a personal data base held by a mail distributor. For this reason, in this embodiment, analysis results having high usability can be obtained.

Second Embodiment

As the second embodiment of a reference state output system according to the present invention, a case in which the reference state output system according to the present invention is applied when contents such as a homepage on a WWW server is referred to will be described below. The following description of the second embodiment can also be applied to the description of an embodiment of a reference state output method according to the present invention. Therefore, the following description is also used as the description of an embodiment of the reference state output method according to the present invention.

Figure 17:
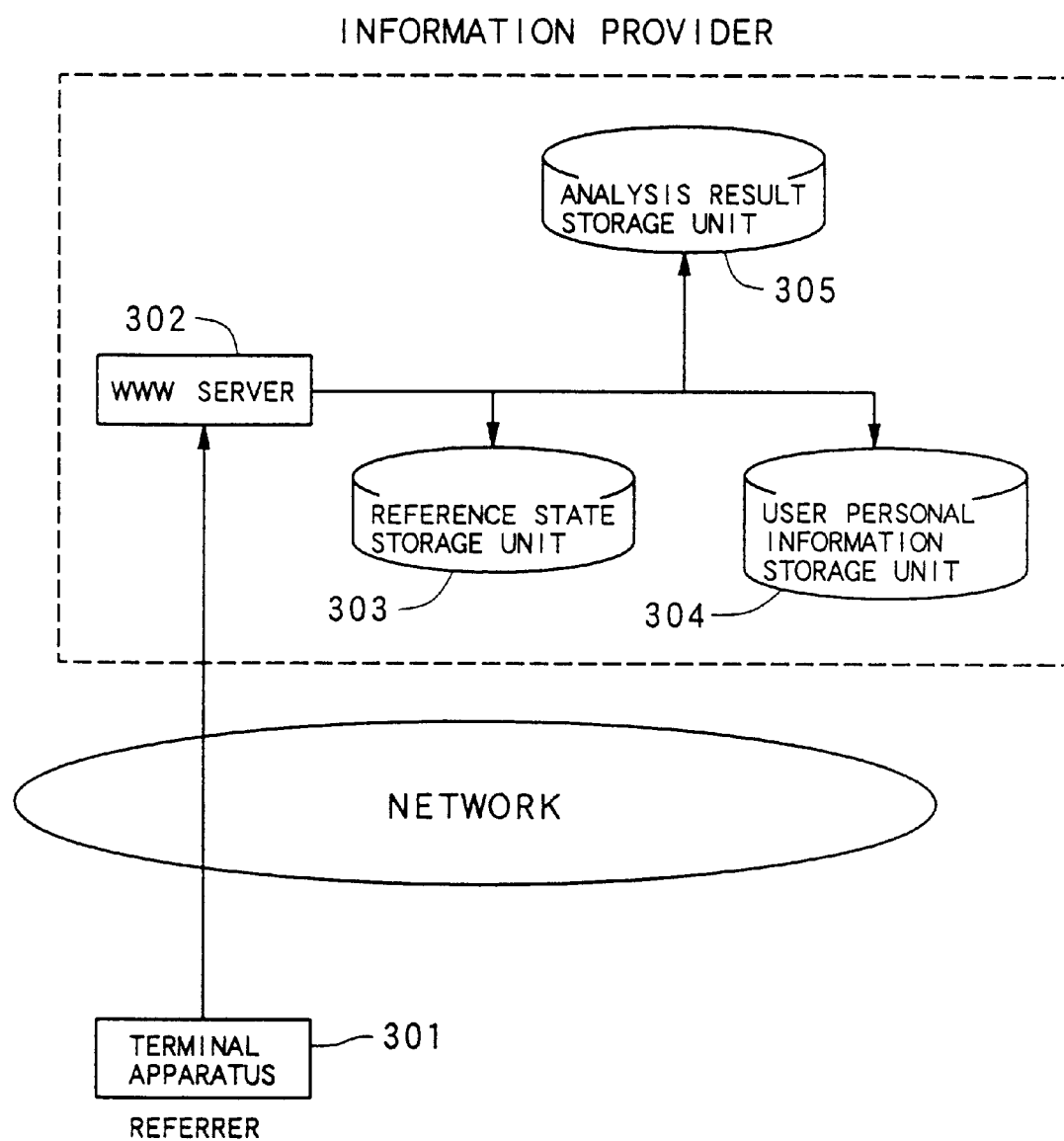
FIG. 17 is an entire schematic diagram of the second embodiment of a reference state output system according to the present invention.

FIG. 17 shows an entire schematic diagram of the second embodiment of a reference state output system according to the present invention.

As shown in FIG. 17, the reference state output system in this embodiment comprises a terminal apparatus 301 held by a referrer, a WWW server 302 connected to the terminal apparatus 301 through a network and held by an information provider serving as a WWW server according to the present invention, a reference information storage unit 303 serving as a storage unit according to the present invention, a user personal information storage unit 304, and an analysis result storage unit 305. In the reference state output system according to the present invention, the number of comprised WWW servers and the number of comprised terminal apparatuses are not limited to one each, and an arbitrary number (one or more) of WWW servers and an arbitrary number (one or more) of terminal apparatuses may be used.

As described above, in this embodiment, unlike the first embodiment described above, the reference states of pieces of information distributed to the terminal apparatus 301 are not investigated.

In this embodiment, the reference states of contents such as homepages on the WWW server 302 held by the information provider are investigated, and analysis results are output by using user personal information.

More specifically, the WWW server 302 specifies the terminal apparatus 301 which accesses the WWW server 302, calculates deviations in units of pieces of information as reference states from reference times, and stores analysis results on the basis of the user personal information and the reference states.

As devices held by the terminal apparatus 301 shown in FIG. 17, the same units as those shown in FIG. 2 may be used.

The terminal apparatus 301 comprises a display device according to the present invention.

Figure 18:
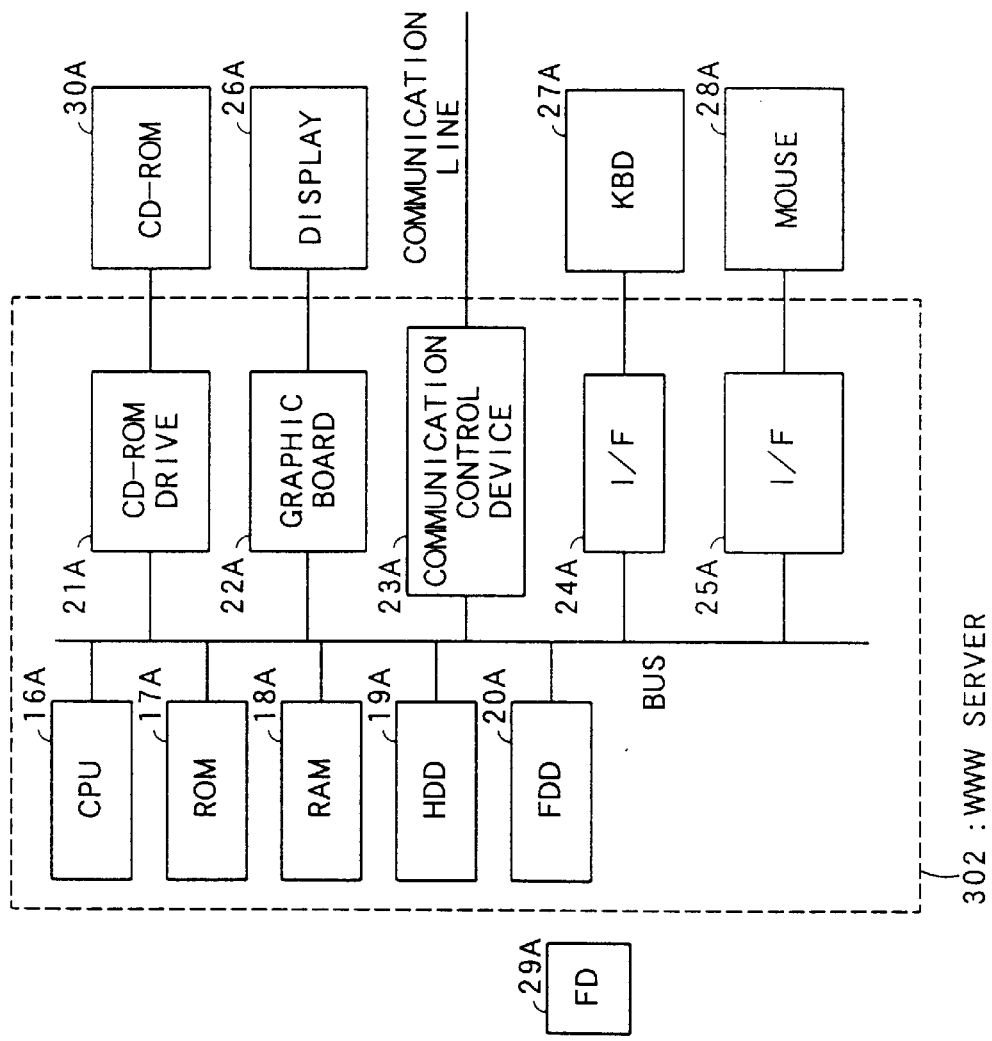
FIG. 18 is a block diagram of devices included in a WWW server in the second embodiment of the reference state output system according to the present invention.

As the device held by the WWW server 302 shown in FIG. 17, as shown in FIG. 18, a display 26A and a graphic board 22A serving as a display means shown in FIG. 3 are held by the device shown in FIG. 3. In this case, FIG. 18 shows a block diagram of devices held by the WWW server 302 in the second embodiment of the reference state output system according to the present invention.

Referring to FIG. 18, the WWW server 302 comprises a CPU (Central Processing Unit) 16A, a ROM (Read Only Memory) 17A, a RAM (Random Access Memory) 18A, a hard disk drive (HDD) 19A (including a hard disk), a floppy disk drive (FDD) 20A, a CD-ROM drive 21A, a graphic board 22A, a communication control device 23A, interface circuits (I/Fs) 24A and 25A, and a device driver 32a which are connected to each other through a bus (BUS).

A display 26A such as a cathode ray tube (CRT) or a liquid-crystal display (LCD) is connected to the graphic board 22A. A keyboard (KBD) 27A is connected to the I/F 24. A mouse 28A and a pointing device such as a track ball, a flat space, or a joy stick are connected to the I/F 25A. In addition, a digital camera 31A is connected to the device driver 32A.

The ROM 17A stores a starting program therein. The starting program is executed by the CPU 16A when the power supply of the WWW server 302 is turned on. In this manner, an operating system (OS) stored in the HDD 19A and a single driver or a plurality of drivers for a display process or a communication process are loaded on the RAM 18A, and various processes or controls can be executed.

In the RAM 18A, a program for controlling the WWW server 302 is developed, and the processing results obtained by the program, temporary data for processing, display data for displaying the processing results or the like on the screen of the display 26, and the like are held. The RAM 18A is used as a work area of the CPU 16A.

The display data developed on the RAM 18A is transmitted to the display 26A through the graphic board 22A, and the display 26A displays the display contents (text, image, and the like) corresponding to the display data on the screen.

The HDD 19A is a device which records or reads a program, control data, text data, image data, and the like on/from the hard disk according to an instruction of the CPU 16A.

In this case, the hard disk included in the HDD 19A holds an application program for causing the WWW server 302 to function as the reference state output system according to the present invention and data used for executing the program.

More specifically, the hard disk corresponds to a computer readable medium on which the reference state output program according to the present invention is recorded. In place of the hard disk, an FD 29A or a CD-ROM 30A may be used as a computer readable medium according to the present invention.

The FDD 20A is a device which records or reads a program, control data, text data, image data, and the like on/from the FD 29A according to an instruction of the CPU 16A.

The CD-ROM drive 21A is a device for reading a program or data recorded on the CD-ROM (read only memory using a compact disk) 30A according to an instruction of the CPU 16A.

The communication control device 23A transmits/receives data to/from another device or downloads a program or data by using a communication line connected to the WWW server 302 according to an instruction of the CPU 16A.

The KBD 27A comprises a plurality of keys (character input keys, cursor keys, and the like), and are used when an operator inputs data in the WWW server 302. The mouse 28A is used to input a selection instruction using a displayed mouse cursor displayed on the display 26A.

The CPU 16A executes the various programs stored in the ROM 17A, the HDD 19A, the FD 29A, and the CD-ROM 30A corresponding to the storage units and the storage media of the present invention to give instructions to constituent elements in the WWW server 302, and controls the operations of the WWW server 302 and the peripheral device.

The programs or the data held in the recording media such as the hard disk and the like may be held in advance. Programs or data downloaded from another device may be held in the hard disk.

All the constituent elements shown in FIG. 18 are not necessary constituent elements for the present invention.

For example, the CD-ROM drive 21A and the CD-ROM 30A shown in FIG. 18 can be omitted.

Figure 19:
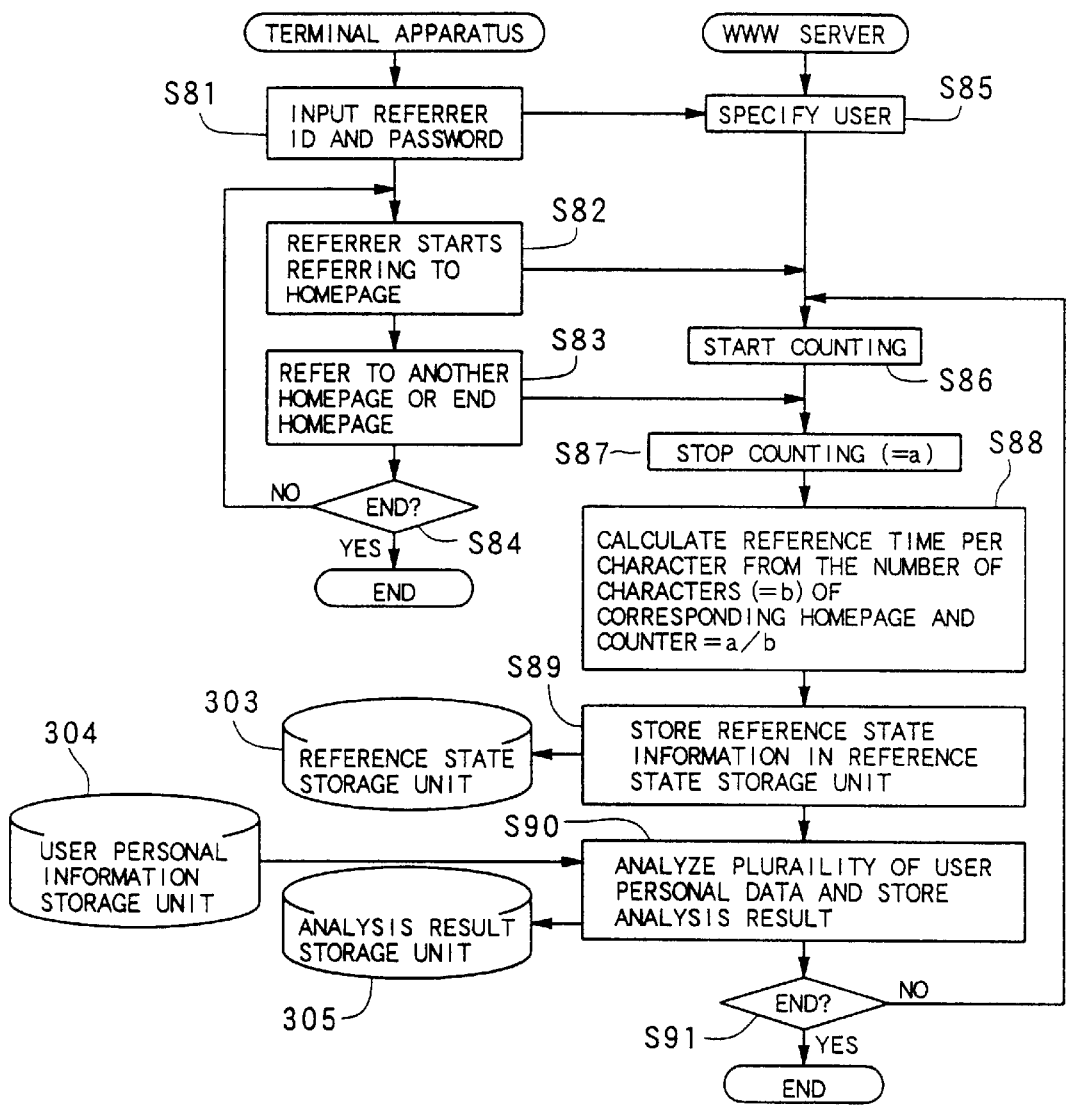
FIG. 19 is a flow chart showing the operation of the second embodiment of the reference state output system according to the present invention shown in FIG. 17.

The operation of the second embodiment of the reference state output system according to the present invention shown in FIG. 17 will be described below with reference to FIG. 19. FIG. 19 shows the flow chart of the operation of the second embodiment of the reference state output system according to the present invention shown in FIG. 17.

As shown in FIG. 19, when a referrer refers to a homepage, the referrer inputs her/his own referrer ID and password to the terminal apparatus 301 to access the WWW server 302 (step S81).

When the referrer inputs her/his own ID and password, the contents of the WWW server 302 is downloaded on, e.g., an HDD or the like in the terminal apparatus 301 of the referrer.

The CPU 16A of the WWW server 302 checks whether a referrer who accesses the WWW server 302 is the terminal apparatus 301 of a covenantor or not, and specifies a user (step S85). This operation is performed for identification, and is required to cooperate a reference state and a personal data base with each other (to be described later).

If a referrer who accesses the WWW server 302 is a covenantor, the CPU 16A of the WWW server 302 gives the right to access the subsequent contents to the terminal apparatus 301 of the referrer.

The CPU of the terminal apparatus 301 to which the access right is given make it possible to display the contents stored in an HDD or the like on the display.

The CPU 16A of the WWW server 302 starts counting (step S86) when the terminal apparatus 301 of the referrer starts referring to a homepage (step S82).

The CPU 16A of the WWW server 302 stops the counting (step S87) when the terminal apparatus 301 of the referrer refers to another homepage or ends the homepage (step S83).

Here, the case in which the terminal apparatus 301 of the referrer refers to a homepage means the case in which one URL address is displayed. Therefore, when the page of another URL address is displayed on the display, another homepage is referred to.

The CPU 16A of the WWW server 302 calculates the reference time per character on the basis of the number of characters of the homepage and the counter (step S88).

The reference time in this case can be calculated by the following equation in the same manner as that of the first embodiment:

reference time=(count number)/(the number of characters included in article).

The number of characters is the number of characters per article in the article on the homepage stored in the HDD 19A of the WWW server 302.

The CPU 16A of the WWW server 302 stores data (the number of data, total of reference times, total of reference time \*\*2, and deviations) related to deviations in the reference information storage unit 303 as reference state information.

Definition of the data related to the deviations and definition of the deviations are the same as the definition of the data related to the deviations and the definition of the deviations in the first embodiment described above, respectively. More specifically, the data related to the deviations and the-deviations are calculated as in the same manner as that in which the data related to the deviations and the deviations are calculated by the calculation unit 62 and the editing unit 63 shown in FIG. 4.

The CPU 16A of the WWW server 302 analyzes data required by a company by using a plurality of user personal data stored in the user personal information storage unit 304, and stores the data as analysis results in the analysis result storage unit 305 (step S90).

The data of the analysis results can be calculated such that the reference state stored in the reference information storage unit 303 shown in FIG. 17 and the user personal information stored in the user personal information storage unit 304 are cooperated with each other as described above with reference to FIG. 16.

As data required by a company and serving as the analysis results, data representing that persons of which ages often see which articles, data representing that persons having which occupations are interested in which articles, or the like is used.

In this manner, in the second embodiment of the reference state output system according to the present invention, a reference state concerning the degree of interest with which each referrer refers to information carried on a homepage serving as the contents on a WWW server can be easily and accurately collected.

This is because, in this embodiment, the deviations of reference times of pieces of information can be calculated on the basis of the reference times per character of the pieces of information, and the degrees of interest can be objectively investigated without depending on the numbers of characters in the pieces of information and regardless of the speeds at reading the pieces of information of the referrers.

In addition, in this embodiment, after the pieces of information are collected, reference states or the like classified by the layers of referrers for the pieces of information are analyzed in cooperation with a personal data base held by an information provider, and analysis results having high usability can be obtained.

As described above, according to the present invention, a user does not manually collect pieces of information, but the user automatically can perform collection, storage, edition, analysis, and transmission (in case of electronic mails) of reference states, and the user uses the deviations of reference times per character of the pieces of information. For this reason, a reference state output system being capable of accurately outputting the degree of interest in information of a person who refers the information, a reference state output method being capable of accurately outputting the degree of interest in information of a person who refers the information, and a computer readable medium on which a reference state output program being capable of accurately outputting the degree of interest in information of a person who refers the information is recorded can be provided.

A person who distributes information can provide analysis information of obtained reference states to an information provider such as a company, and the information provider such as a company can conjecture the tastes of users who refer to articles of the company on the basis of the distributed analysis information. For this reason, a reference state output system being capable of accurately outputting information which considerably contributes to activities in the future to the information provider such as a company, a reference state output method being capable of accurately outputting information which considerably contributes to activities in the future to the information provider such as a company, and a computer readable medium on which a reference state output program being capable of accurately outputting information which considerably contributes to activities in the future to the information provider such as a company can be provided.

What is claimed is:

1. A system, having a display device for displaying information, for outputting a reference state of a referrer for the information, comprising:

a storage unit for storing reference times per predetermined number of characters of the referrer for pieces of information displayed on the display device;

a standard deviation calculation unit which reads the reference times stored in the storage unit and calculates a standard deviation of the reference times; a degree-of-interest calculation unit for calculating the degrees of interest corresponding to the reference times by using the standard deviation calculated by the standard deviation calculation unit;

an analysis unit for analyzing the degrees of interest calculated by the degree-of-interest calculation unit by using data related to an information referrer, wherein the data related to the information referrer is hobby data representing the hobby of the information referrer, and the analysis unit forms analysis results including specific information of the information, the degree of interest corresponding to the information, and hobby data corresponding to the degree of interest; and a transmission unit for the degrees of interest calculated by the degree-of-interest calculation unit to the analysis unit through a network, wherein when the transmission unit gives the degrees of interest to the analysis unit through the network, a warning for inquiring of a referrer whether the transmission can be performed or not.

2. A reference state output system according to claim 1, wherein the data related to the information referrer is age data representing the age of the information referrer, and the analysis unit forms analysis results including specific information of the information, the degree of interest corresponding to the information, and age data corresponding to the degree of interest.

3. A reference state output system according to claim 1, wherein the data related to the information referrer is name data representing the name of the information referrer, and the analysis unit forms analysis results including specific information of the information, the degree of interest corresponding to the information, and name data corresponding to the degree of interest.

4. A reference state output system according to claim 1, wherein the data related tQ the information referrer is sex data representing the sex of the information referrer, and the analysis unit forms analysis results including specific information of the information, the degree of interest corresponding to the information, and sex data corresponding to the degree of interest.

5. A reference state output system according to claim 1, wherein the data related to the information referrer is occupation data representing the occupation of the information referrer, and the analysis unit forms analysis results including specific information of the information, the degree of interest corresponding to the information, and occupation data corresponding to the degree of interest.

6. A reference state output system according to claim 1, wherein the data related to the information referrer is area data representing an area at which the information referrer refers to the information, and the analysis unit forms analysis results including specific information of the information, the degree of interest corresponding to the information, and area data corresponding to the degree of interest.

7. A reference state output system according to claim 1, wherein the standard deviation calculation unit calculates the standard deviation by using the number of pieces of information which are referred to, a total of reference times of the pieces of information which are referred to, and a total of squares of the reference times.

8. A reference state output system according to claim 7, further comprising a reference time calculation unit for calculating the reference times, wherein the storage unit stores the reference times calculated by the reference time calculation unit.

9. A reference state output system according to claim 8, further comprising:

an information storage unit in which pieces of information displayed on the display device are stored; and a display control unit for respectively displaying the pieces of information stored in the information storage unit on the display device.

10. A reference state output system according to claim 9, further comprising an acquisition unit for acquiring the pieces of information, wherein the information storage unit stores the pieces of information acquired by the acquisition unit.

11. A reference state output system according to claim 10, wherein the acquisition unit includes a receiving unit for receiving information transmitted through a network.

12. A reference state output system according to claim 11, wherein the receiving unit receives information carried on an electronic mail transmitted through the network.

13. A reference state output system according to claim 12, further comprising a determination unit for checking whether information received by the receiving unit through the network is information the reference time of which must be calculated is not, wherein the information determined by the determination unit as the information the reference time of which must be calculated is stored in the information storage unit.

14. A reference state output system according to claim 11, wherein the receiving unit receives information transmitted from a world wide web server connected to the receiving unit through the network.

15. A reference state output system according to claim 14, wherein the reference time has an upper limit which is not related to time for which information is actually displayed.

* * * * *

UNITED STATES PATENT AND TRADEMARK OFFICE
CERTIFICATE OF CORRECTION

PATENT NO. : 6,704,783 B1
DATED : March 9, 2004
INVENTOR(S) : K. Shibata

It is certified that error appears in the above-identified patent and that said Letters Patent is hereby corrected as shown below:

Title page, Item [54] and Column 1, lines 1-5,
Title, should read -- A SYSTEM USING STANDARD DEVIATION FOR CALCULATING DEGREE-OF-INTEREST CORRESPONDING TO THE REFERENCE TIMES AND OUTPUTTING A REFERENCE STATE TO AN INFORMATION REFERRER --

Column 23,
Line 20, should read -- wherein the data related to the information referrer is sex --.

Signed and Sealed this

Thirteenth Day of July, 2004

JON W. DUDAS
*Acting Director of the United States Patent and Trademark Office*